(12) United States Patent
Xia et al.

(10) Patent No.: US 11,470,627 B2
(45) Date of Patent: Oct. 11, 2022

(54) UPLINK INFORMATION SENDING METHOD AND APPARATUS, AND UPLINK INFORMATION RECEIVING METHOD AND APPARATUS

(71) Applicant: Huawei Technologies Co., Ltd., Shenzhen (CN)

(72) Inventors: Jinhuan Xia, Beijing (CN); Yongxia Lyu, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/793,866

(22) Filed: Feb. 18, 2020

(65) Prior Publication Data
US 2020/0187230 A1 Jun. 11, 2020

Related U.S. Application Data

(63) Continuation of application No. PCT/CN2018/100978, filed on Aug. 17, 2018.

(30) Foreign Application Priority Data

Aug. 18, 2017 (CN) .......................... 201710713961.0

(51) Int. Cl.
*H04W 72/12* (2009.01)
*H04W 72/04* (2009.01)

(52) U.S. Cl.
CPC ....... *H04W 72/1268* (2013.01); *H04W 72/04* (2013.01)

(58) Field of Classification Search
CPC .................... H04W 72/1268; H04W 72/04
See application file for complete search history.

(56) References Cited

U.S. PATENT DOCUMENTS

2014/0254544 A1* 9/2014 Kar Kin Au ........ H04L 27/2613
370/329
2016/0219627 A1 7/2016 Au et al.
(Continued)

FOREIGN PATENT DOCUMENTS

CN 105636211 A 6/2016
CN 106507497 A 3/2017
(Continued)

OTHER PUBLICATIONS

"UE behaviors related to SFI," 3GPP TSG RAN WG1 Meeting 90#, Prague, P.R. Czechia, R1-1712851, total 5 pages, 3rd Generation Partnership Project, Valbonne, France (Aug. 21-25, 2017).
(Continued)

*Primary Examiner* — Ayanah S George
(74) *Attorney, Agent, or Firm* — Leydig, Voit & Mayer, Ltd.

(57) ABSTRACT

This application provides an uplink information sending method, including: determining, based on a transmission direction of a transmission resource and a preset grant-free transmission resource, a grant-free transmission resource used for uplink transmission, where the transmission resource includes the grant-free transmission resource; and sending uplink information on the grant-free transmission resource used for uplink transmission. According to the method, the grant-free transmission resource used for uplink transmission may be a subset of the preset grant-free transmission resource or may be a resource determined based on a location of the preset grant-free transmission resource. In either case, the grant-free transmission resource used for uplink transmission belongs to the transmission resource whose transmission direction is uplink transmission direction.

17 Claims, 15 Drawing Sheets

Network device

Terminal device

(56) References Cited

U.S. PATENT DOCUMENTS

| | | | |
|---|---|---|---|
| 2017/0237463 A1 | 8/2017 | Zheng et al. | |
| 2018/0199381 A1 | 7/2018 | Rong et al. | |
| 2018/0279304 A1* | 9/2018 | Lee | H04W 72/042 |
| 2018/0368157 A1* | 12/2018 | Jeon | H04L 5/0053 |

FOREIGN PATENT DOCUMENTS

| | | |
|---|---|---|
| CN | 106788943 A | 5/2017 |
| EP | 3340726 B1 | 3/2020 |
| JP | 2018518915 A | 7/2018 |
| WO | 2017132996 A1 | 8/2017 |

OTHER PUBLICATIONS

"Discussion on the contents of group common PDCCH," 3GPP TSG RAN WG1 NR Ad Hoc #2, Qingdao, China, R1-1710310, XP051299526, total 6 pages, 3rd Generation Partnership Project, Valbonne, France (Jun. 27-30, 2017).

"3rd Generation Partnership Project; Technical Specification Group Radio Access Network; NR; Physical layer procedures for control (Release 15)," 3GPP TS 38.213 V0.0.2, total 16 pages, 3rd Generation Partnership Project, Valbonne, France (Aug. 2017).

"Discussion on UL grant-free resource configuration," 3GPP TSG-RAN WG2 Meeting#99, Berlin, Germany, R2-1708486 (Revised of R2-1707063), total 5 pages, 3rd Generation Partnership Project, Valbonne, France (Aug. 21-25, 2017).

"UE Behavior for UE-Group Common PDCCH Detection," 3GPP TSG RAN WG1 NR ad-Hoc#2, Qingdap, China, R1-1710699, XP051299905, total 3 pages, 3rd Generation Partnership Project, Valbonne, France (Jun. 27-30, 2017).

"3rd Generation Partnership Project; Technical Specification Group Radio Access Network; NR; Physical layer procedures for data (Release 15)," 3GPP TS 38.214 V0.0.1, total 21 pages, 3rd Generation Partnership Project, Valbonne, France (Jul. 2017).

"UL grant-free transmissions: Resource configuration," 3GPP TSG RAN WG1 NR Ad-Hoc#2, Qingdao, P.R. China, R1-1710568, XP051299775, total 5 pages, 3rd Generation Partnership Project, Valbonne, France (Jun. 27-30, 2017).

"3rd Generation Partnership Project; Technical Specification Group Radio Access Network; NR; Medium Access Control (MAC) protocol specification (Release 15)," 3GPP TS 38.321 V0.1.0, total 31 pages, 3rd Generation Partnership Project, Valbonne, France (Jun. 2017).

TCL Communication, "Grant-free transmissions," 3GPP TSG RAN WG2 #99, Berlin, Germany, R2-1709228, total 5 pages, 3rd Generation Partnership Project, Valbonne, France (Aug. 21-25, 2017).

Intel Corporation, "UL data transmission without grant," 3GPP TSG RAN WG1 #90, Prague, Czech Republic, R1-1712592, total 7 pages, 3rd Generation Partnership Project, Valbonne, France (Aug. 21-25, 2017).

Sony, "On UE behaviour related to GC-PDCCH," 3GPP TSG RAN WG1#90, R1-1712971, Prague, Czech Republic, total 4 pages, 3rd Generation Partnership Project, Valbonne, France (Aug. 21-25, 2017).

Sony, "On remaining details on group-common PDCCH," 3GPP TSG RAN WG1 Meeting NR#3, Nagoya, Japan, R1-1716247, total 5 pages, 3rd Generation Partnership Project, Valbonne, France (Sep. 18-21, 2017).

* cited by examiner

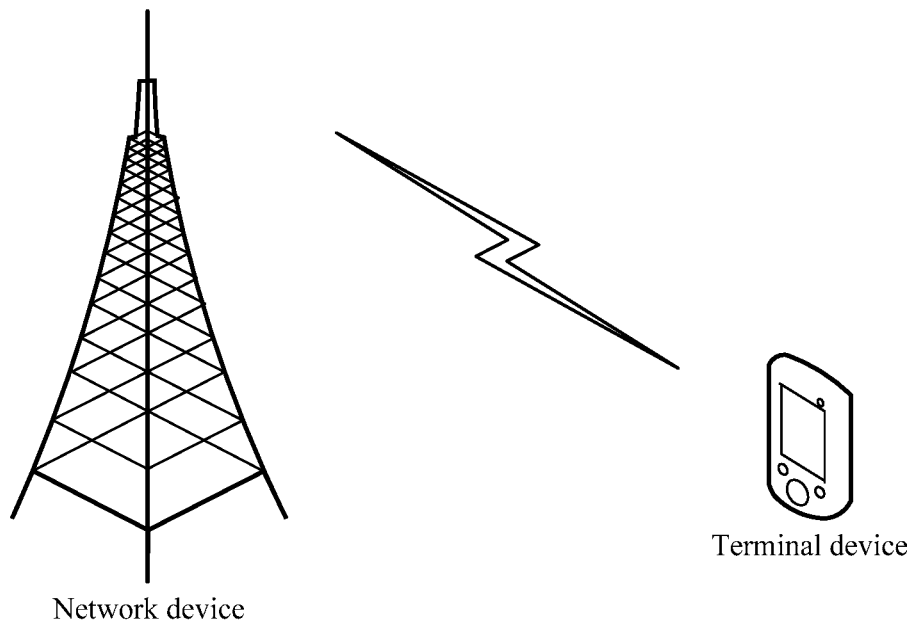

Determine, based on a transmission direction of a transmission resource and a preset grant-free transmission resource, a grant-free transmission resource used for uplink transmission, where the transmission resource includes the grant-free transmission resource — S201

Send uplink information on the grant-free transmission resource used for uplink transmission — S202

FIG. 2

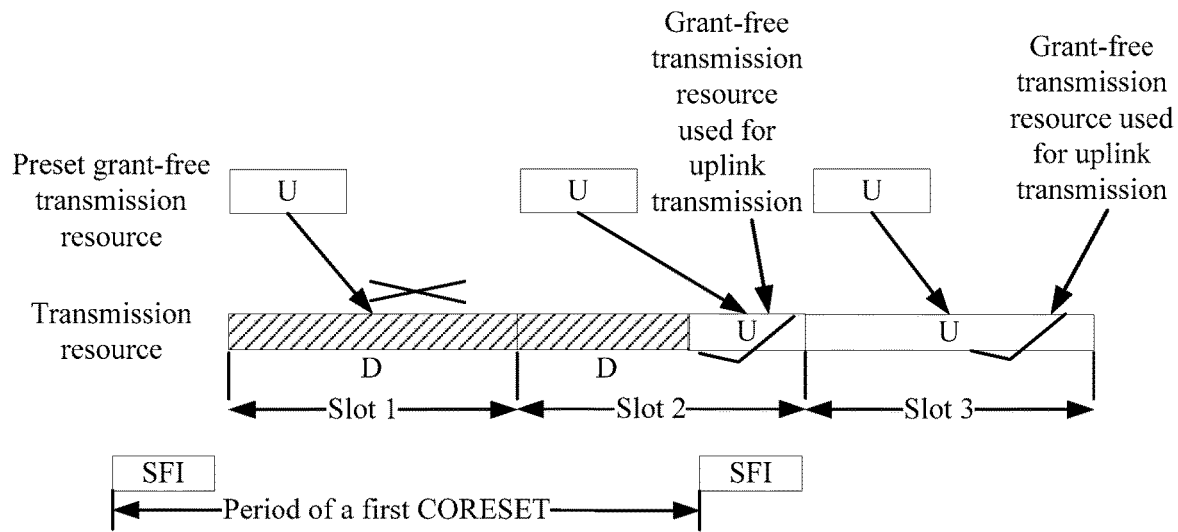

| Receive first configuration information, where the first configuration information is used to configure a grant-free transmission resource | — S601 |

| Receive second configuration information, where the second configuration information is used to configure a first control resource set | — S602 |

| Monitor fourth indication information on the first control resource set, where the fourth indication information is used to indicate an offset of the grant-free transmission resource configured by using the first configuration information | — S603 |

| Determine, based on the offset indicated by the monitored fourth indication information and the grant-free transmission resource configured by using the first configuration information, a grant-free transmission resource used for uplink transmission | — S604 |

| Send uplink information on the grant-free transmission resource used for uplink transmission | — S605 |

FIG. 6

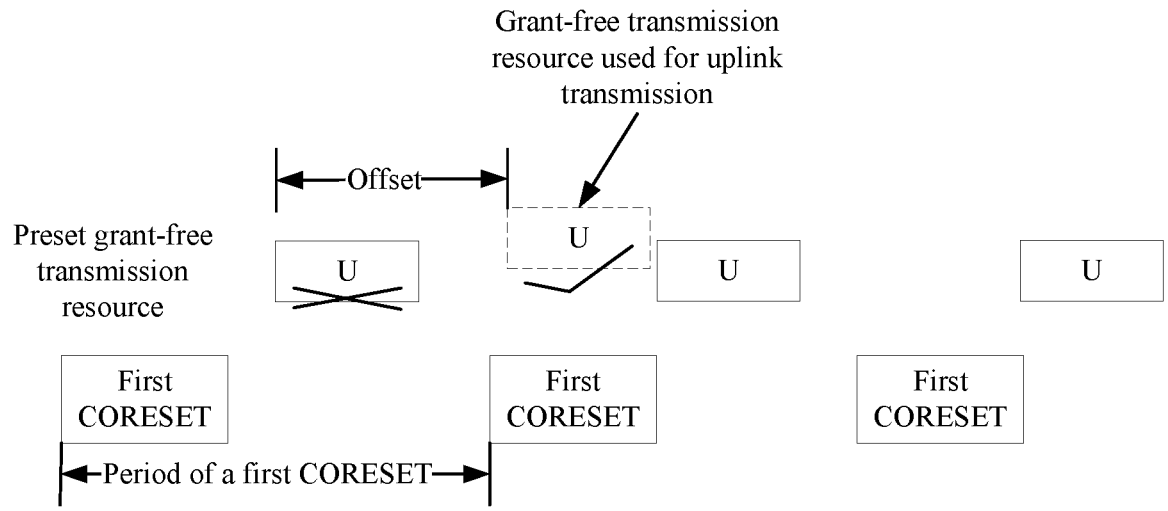

Send first information, where the first information is used to indicate a transmission direction of a transmission resource, and the transmission direction includes an uplink transmission direction — S801

Send first configuration information, where the first configuration information is used to configure a grant-free transmission resource, and the grant-free transmission resource is a subset of a transmission resource whose transmission direction is the uplink transmission direction — S802

Receive uplink information on the grant-free transmission resource — S803

| Determine, based on a transmission direction of a transmission resource and a preset grant-free transmission resource, a grant-free transmission resource used for uplink transmission, where the transmission resource includes the grant-free transmission resource | — S1201 |

| Receive uplink information on the grant-free transmission resource used for uplink transmission | — S1202 |

| Send first configuration information, where the first configuration information is used to configure a grant-free transmission resource | — S1301 |

| Send second configuration information, where the second configuration information is used to configure a first control resource set | — S1302 |

| Send fourth indication information on the first control resource set, where the fourth indication information is used to indicate an offset | — S1303 |

| Determine, based on the offset and the grant-free transmission resource configured by using the first configuration information, a grant-free transmission resource used for uplink transmission | — S1304 |

| Receive uplink information on the grant-free transmission resource used for uplink transmission | — S1305 |

Determine, based on a transmission direction of a transmission resource and a preset downlink control resource set, a downlink control resource set used for detecting downlink control channels, where the transmission resource includes the downlink control resource set — S1401

Detect a downlink control channel on the downlink control resource set used for detecting downlink control channels — S1402

Determine, based on a transmission direction of a transmission resource and a preset downlink control resource set, a downlink control resource set used for sending downlink control channels, where the transmission resource includes the downlink control resource set — S1501

Send a downlink control channel on the downlink control resource set used for sending downlink control channels — S1502

Send second information, where the second information is used to indicate a transmission direction of a transmission resource, and the transmission direction includes a downlink transmission direction — S1601

Send fourth configuration information, where the fourth configuration information is used to configure a downlink control resource set, and the downlink control resource set is a subset of a transmission resource whose transmission direction is the downlink transmission direction — S1602

Send a downlink control channel on the downlink control resource set — S1603

FIG. 16

UPLINK INFORMATION SENDING METHOD AND APPARATUS, AND UPLINK INFORMATION RECEIVING METHOD AND APPARATUS

CROSS-REFERENCE TO RELATED APPLICATIONS

This application is a continuation of International application PCT/CN2018/100978, filed on Aug. 17, 2018, which claims priority to Chinese Patent Application No. 201710713961.0, filed on Aug. 18, 2017. The disclosures of the aforementioned applications are hereby incorporated by reference in their entireties.

TECHNICAL FIELD

Embodiments of this application relate to the communications field, and in particular, to an uplink information sending method and apparatus, and an uplink information receiving method and apparatus in the wireless communications field.

BACKGROUND

In a 5th generation (5G) mobile communications system, transmission resources include transmission resources used for uplink transmission and transmission resources used for downlink transmission. For example, a network device may indicate, by using configuration information, which slot of a transmission resource is used for uplink transmission and which slot is used for downlink transmission.

Grant-free transmission is a transmission method proposed in the 5G mobile communications system. A terminal device that performs transmission in a grant-free manner can directly send uplink information on a preset grant-free transmission resource without waiting for resource scheduling information from the network device. Therefore, grant-free transmission is characterized by a low latency.

A grant-free transmission resource is a preset transmission resource whose transmission direction is an uplink transmission direction. For example, the network device may configure a semi-static grant-free transmission resource for the terminal device by using resource configuration signaling, and a location of the grant-free transmission resource does not change before a next piece of resource configuration signaling from the network device arrives. However, a transmission direction of a transmission resource may change at any time. Grant-free transmission may fail when the grant-free transmission resource is on a same frequency band as a transmission resource and a transmission resource whose transmission direction is a downlink direction exists in a time range within which the grant-free transmission resource is located.

SUMMARY

This application provides an uplink information sending method and apparatus, to avoid a grant-free transmission failure caused by the foregoing case.

According to a first aspect, an uplink information sending method is provided, including: determining, based on a transmission direction of a transmission resource and a preset grant-free transmission resource, a grant-free transmission resource used for uplink transmission, where the transmission resource includes the grant-free transmission resource; and sending uplink information on the grant-free transmission resource used for uplink transmission.

According to the method provided in this embodiment, the grant-free transmission resource used for uplink transmission may be a subset of the preset grant-free transmission resource or may be a resource determined based on a location of the preset grant-free transmission resource. In either case, the grant-free transmission resource used for uplink transmission belongs to a transmission resource whose transmission direction is uplink transmission. A terminal device may determine, based on the transmission direction of the transmission resource and the preset grant-free transmission resource, the grant-free transmission resource used for uplink transmission, thereby avoiding a grant-free transmission failure caused when a transmission direction of a preset grant-free transmission resource is inconsistent with a transmission direction of a transmission resource.

Optionally, before the determining, based on a transmission direction of a transmission resource and a preset grant-free transmission resource, a grant-free transmission resource used for uplink transmission, the method further includes: receiving first configuration information, where the first configuration information is used to configure the preset grant-free transmission resource.

The preset grant-free transmission resource may be preconfigured by the terminal device based on the first configuration information sent by a network device, and the first configuration information includes configuration information related to the preset grant-free transmission resource, for example, parameters such as a time-frequency resource, a reference signal, and transmit power, thereby improving flexibility of grant-free transmission.

Optionally, the preset grant-free transmission resource may be a transmission resource whose transmission direction is an uplink direction by default (for example, according to a communications protocol), and may be determined by the terminal device without receiving the configuration information sent by the network device.

Optionally, before the determining, based on a transmission direction of a transmission resource and a preset grant-free transmission resource, a grant-free transmission resource used for uplink transmission, the method further includes: receiving first information, where the first information is used to indicate the transmission direction of the transmission resource, where the first information includes at least one piece of the following information: first indication information, where the first indication information is used to indicate the transmission direction of the transmission resource; and second indication information, where the second indication information is used to indicate the transmission direction of the transmission resource; and the first indication information and the second indication information are carried in different signaling.

The first information may be carried in different signaling, thereby improving flexibility and reliability of indicating the transmission direction of the transmission resource.

Optionally, the second indication information is carried in physical layer signaling, and the method further includes: receiving second configuration information, where the second configuration information is used to configure a first control resource set; and monitoring the second indication information on the first control resource set.

The terminal device may determine the first control resource set based on the second configuration information sent by the network device, where the first control resource set is used to transmit the second indication information; and the terminal device monitors the second indication information on the first control resource set, so that the terminal device is spared from monitoring the second indication information all the time, thereby reducing power consumption of the terminal device.

Optionally, the first information further includes third indication information, the third indication information is used to indicate a transmission direction of a flexible and variable resource in the transmission resource, and the method further includes: receiving third configuration information, where the third configuration information is used to configure a second control resource set; and monitoring the third indication information on the second control resource set.

The terminal device may determine the second control resource set based on the third configuration information sent by the network device, where the second control resource set is used to transmit the third indication information; and the terminal device monitors the third indication information on the second control resource set, so that the terminal device is spared from monitoring the third indication information all the time, thereby reducing power consumption of the terminal device.

Optionally, the determining, based on a transmission direction of a transmission resource and a preset grant-free transmission resource, a grant-free transmission resource used for uplink transmission includes: receiving fourth indication information, where the fourth indication information is used to indicate an offset of the preset grant-free transmission resource; and determining, based on the transmission direction of the transmission resource, the preset grant-free transmission resource, and the fourth indication information, the grant-free transmission resource used for uplink transmission.

When a transmission resource used for downlink transmission conflicts with the preset grant-free transmission resource, the terminal device may determine the offset of the preset grant-free transmission resource based on the fourth indication information sent by the network device, and determine, based on the offset and a location of the preset grant-free transmission resource, a location of the grant-free transmission resource used for uplink transmission, thereby avoiding a grant-free transmission failure caused when a transmission direction of a grant-free transmission resource is inconsistent with a transmission direction of a transmission resource.

Optionally, the grant-free transmission resource used for uplink transmission is a transmission resource whose transmission direction is an uplink transmission direction in a time period corresponding to the preset grant-free transmission resource.

The terminal device needs to determine, based on a transmission direction of a transmission resource in a time period corresponding to a grant-free transmission resource, whether the grant-free transmission resource is available. When a transmission resource in the time period corresponding to the grant-free transmission resource is used for uplink transmission, the grant-free transmission resource is available. When all transmission resources in the time period corresponding to the grant-free transmission resource are used for downlink transmission, the grant-free transmission resource is unavailable. For example, when a first resource in grant-free transmission resources is unavailable, the terminal device may determine an available second resource from the transmission resources, and use the second resource as the grant-free transmission resource used for uplink transmission. The second resource may be a grant-free transmission resource in preset grant-free transmission resources that is after the first resource, and a transmission direction of each transmission resource in a time period in which the grant-free transmission resource is located is an uplink direction; or the second resource may be an available transmission resource whose transmission direction is an uplink direction in a time period (for example, a slot) corresponding to the first resource. According to the method provided in this embodiment, a grant-free transmission failure caused when a transmission direction of a preset grant-free transmission resource is inconsistent with a transmission direction of a transmission resource can be avoided. When the second resource is an available transmission resource in the time period corresponding to the first resource, the terminal device may send uplink information on a resource other than the preset grant-free transmission resource, thereby reducing a latency in sending the uplink information.

According to a second aspect, an uplink information sending method is provided, including: receiving first configuration information, where the first configuration information is used to configure a grant-free transmission resource; receiving second configuration information, where the second configuration information is used to configure a first control resource set; monitoring fourth indication information on the first control resource set, where the fourth indication information is used to indicate an offset of the grant-free transmission resource configured by using the first configuration information; determining, based on the offset indicated by the monitored fourth indication information and the grant-free transmission resource configured by using the first configuration information, a grant-free transmission resource used for uplink transmission; and sending uplink information on the grant-free transmission resource used for uplink transmission.

According to the method provided in this embodiment, a terminal device may determine the offset of the grant-free transmission resource based on the fourth indication information, and determine, based on an initial location of the grant-free transmission resource and the offset, the grant-free transmission resource used for uplink transmission, thereby avoiding a grant-free transmission failure caused when a transmission direction of a grant-free transmission resource is inconsistent with a transmission direction of a transmission resource.

Optionally, the offset is used to determine a start location at which the grant-free transmission resource configured by using the first configuration information is activated or deactivated, or the offset is used to determine a location of the grant-free transmission resource after the fourth indication information is received.

A location determined by the terminal device based on the offset may be the start location at which the grant-free transmission resource is activated or deactivated, or may be a specific location of the grant-free transmission resource, so that the grant-free transmission resource used for sending uplink information can be flexibly determined.

According to a third aspect, an uplink information receiving method is provided, including: determining, based on a transmission direction of a transmission resource and a preset grant-free transmission resource, a grant-free transmission resource used for uplink transmission, where the transmission resource includes the grant-free transmission resource; and receiving uplink information on the grant-free transmission resource used for uplink transmission.

According to the method provided in this embodiment, the grant-free transmission resource used for uplink transmission may be a subset of the preset grant-free transmission resource or may be a resource determined based on a location of the preset grant-free transmission resource. In either case, the grant-free transmission resource used for uplink transmission belongs to the transmission resource whose transmission direction is uplink transmission. A network device may determine, based on the transmission direction of the transmission resource and the preset grant-free transmission resource, the grant-free transmission resource used for uplink transmission, thereby avoiding a grant-free transmission failure caused when a transmission direction of a preset grant-free transmission resource is inconsistent with a transmission direction of a transmission resource.

Optionally, before the receiving uplink information on the grant-free transmission resource used for uplink transmission, the method further includes: sending first configuration information, where the first configuration information is used to configure the preset grant-free transmission resource.

The preset grant-free transmission resource may be a transmission resource whose transmission direction is an uplink direction by default (for example, according to a communications protocol), and the network device does not need to send the first configuration information to a terminal device. Alternatively, the network device may preconfigure the preset grant-free transmission resource by sending the first configuration information, and the first configuration information includes configuration information related to the preset grant-free transmission resource, for example, parameters such as a time-frequency resource, a reference signal, and transmit power, thereby improving flexibility of grant-free transmission.

Optionally, before the receiving uplink information on the grant-free transmission resource used for uplink transmission, the method further includes: sending first information, where the first information is used to indicate the transmission direction of the transmission resource, where the first information includes at least one piece of the following information: first indication information, where the first indication information is used to indicate the transmission direction of the transmission resource; and second indication information, where the second indication information is used to indicate the transmission direction of the transmission resource; and the first indication information and the second indication information are carried in different signaling.

The first information may be carried in different signaling, thereby improving flexibility and reliability of indicating the transmission direction of the transmission resource.

Optionally, the second indication information is carried in physical layer signaling, and the method further includes: sending second configuration information, where the second configuration information is used to configure a first control resource set, and the first control resource set is used to transmit the second indication information.

The network device may configure the first control resource set for the terminal device by using the second configuration information, and send the second indication information on the first control resource set; and the terminal device monitors the second indication information on the first control resource set, so that the terminal device is spared from monitoring the second indication information all the time, thereby reducing power consumption of the terminal device.

Optionally, the first information further includes third indication information, the third indication information is used to indicate a transmission direction of a flexible and variable resource in the transmission resource, and the method further includes: sending third configuration information, where the third configuration information is used to configure a second control resource set, and the second control resource set is used to transmit the third indication information.

The network device may configure the second control resource set for the terminal device by using the third configuration information, and send the third indication information on the second control resource set; and the terminal device monitors the third indication information on the second control resource set, so that the terminal device is spared from monitoring the third indication information all the time, thereby reducing power consumption of the terminal device.

Optionally, before the receiving uplink information on the grant-free transmission resource used for uplink transmission, the method further includes: sending fourth indication information, where the fourth indication information is used to indicate an offset of the preset grant-free transmission resource.

When a transmission resource used for downlink transmission conflicts with the preset grant-free transmission resource, the network device may indicate the offset of the preset grant-free transmission resource to the terminal device by using the fourth indication information, so that the terminal device determines, based on the offset and a location of the preset grant-free transmission resource, a location of the grant-free transmission resource used for uplink transmission, thereby avoiding a grant-free transmission failure caused when a transmission direction of a grant-free transmission resource is inconsistent with a transmission direction of a transmission resource.

Optionally, the grant-free transmission resource used for uplink transmission is a transmission resource whose transmission direction is an uplink transmission direction in a time period corresponding to the preset grant-free transmission resource.

The network device needs to determine, based on a transmission direction of a transmission resource in a time period corresponding to a grant-free transmission resource, whether the grant-free transmission resource is available. When a transmission resource in the time period corresponding to the grant-free transmission resource is used for uplink transmission, the grant-free transmission resource is available. When all transmission resources in the time period corresponding to the grant-free transmission resource are used for downlink transmission, the grant-free transmission resource is unavailable. For example, when a first resource in grant-free transmission resources is unavailable, the network device may determine an available second resource from the transmission resources, and use the second resource as the grant-free transmission resource used for uplink transmission. The second resource may be a grant-free transmission resource in preset grant-free transmission resources that is after the first resource, and a transmission direction of each transmission resource in a time period in which the grant-free transmission resource is located is an uplink direction, or the second resource may be an available transmission resource whose transmission direction is an uplink direction in a time period (for example, a slot) corresponding to the first resource. According to the method provided in this embodiment, a grant-free transmission failure caused when a transmission direction of a preset grant-free transmission resource is inconsistent with a transmission direction of a transmission resource can be avoided.

When the second resource is an available transmission resource in the time period corresponding to the first resource, the network device may receive uplink information on a resource other than the preset grant-free transmission resource, thereby reducing a latency in receiving the uplink information.

According to a fourth aspect, an uplink information receiving method is provided, including: sending first configuration information, where the first configuration information is used to configure a grant-free transmission resource; sending second configuration information, where the second configuration information is used to configure a first control resource set; sending fourth indication information on the first control resource set, where the fourth indication information is used to indicate an offset; determining, based on the offset and the grant-free transmission resource configured by using the first configuration information, a grant-free transmission resource used for uplink transmission; and receiving uplink information on the grant-free transmission resource used for uplink transmission.

According to the method provided in this embodiment, a network device may determine an offset of the grant-free transmission resource based on a transmission direction of a transmission resource and an initial location of the grant-free transmission resource, and indicate the offset to a terminal device by using the fourth indication information, so that the terminal device determines, based on the initial location of the grant-free transmission resource and the offset, the grant-free transmission resource used for uplink transmission, thereby avoiding a grant-free transmission failure caused when a transmission direction of a grant-free transmission resource is inconsistent with a transmission direction of a transmission resource.

Optionally, the offset is used to determine a start location at which the grant-free transmission resource configured by using the first configuration information is activated or deactivated, or the offset is used to determine a location of the grant-free transmission resource after the fourth indication information is received.

A location indicated by the offset may be the start location at which the grant-free transmission resource is activated or deactivated, or may be a specific location of the grant-free transmission resource, so that the grant-free transmission resource used for sending uplink information can be flexibly indicated.

According to a fifth aspect, an uplink information receiving method is provided, including: sending first information, where the first information is used to indicate a transmission direction of a transmission resource, and the transmission direction includes an uplink transmission direction; sending first configuration information, where the first configuration information is used to configure a grant-free transmission resource, and the grant-free transmission resource is a subset of a transmission resource whose transmission direction is the uplink transmission direction; and receiving uplink information on the grant-free transmission resource.

According to the method provided in this embodiment, the grant-free transmission resource configured by a network device by using the first configuration information is a subset of the transmission resource whose transmission direction is the uplink transmission direction. The network device does not need to indicate an offset of the grant-free transmission resource, and does not need to indicate whether the grant-free transmission resource is available, thereby reducing signaling overheads.

Optionally, before the sending first configuration information, the method further includes: determining the grant-free transmission resource based on the transmission direction of the transmission resource.

The network device may first determine the transmission direction of the transmission resource, and then determine the grant-free transmission resource, so that the grant-free transmission resource configured by using the first configuration information is a subset of the transmission resource whose transmission direction is the uplink direction.

Optionally, before the sending first information, the method further includes: determining the transmission direction of the transmission resource based on the grant-free transmission resource.

Alternatively, the network device may first determine the grant-free transmission resource, and then determine the transmission direction of the transmission resource, so that the grant-free transmission resource configured by using the first configuration information is a subset of the transmission resource whose transmission direction is the uplink direction. Alternatively, when the network device modifies the transmission direction of the transmission resource, a transmission direction of the grant-free transmission resource configured by using the first configuration information cannot be changed to a downlink direction.

According to a sixth aspect, an uplink information sending apparatus is provided. The apparatus can implement a function executed by the terminal device in the method in the first aspect. The function may be implemented by hardware, or may be implemented by hardware executing corresponding software. The hardware or the software includes one or more units or modules corresponding to the function.

In a possible design, a structure of the apparatus includes a processor and a transceiver. The processor is configured to support the apparatus in executing the corresponding function in the method in the first aspect. The transceiver is configured to support communication between the apparatus and another network element. The apparatus may further include a memory. The memory is coupled to the processor, and stores a program instruction and data that are necessary for the apparatus.

According to a seventh aspect, an uplink information sending apparatus is provided. The apparatus can implement a function executed by the terminal device in the method in the second aspect. The function may be implemented by hardware, or may be implemented by hardware executing corresponding software. The hardware or the software includes one or more units or modules corresponding to the function.

In a possible design, a structure of the apparatus includes a processor and a transceiver. The processor is configured to support the apparatus in executing the corresponding function in the method in the second aspect. The transceiver is configured to support communication between the apparatus and another network element. The apparatus may further include a memory. The memory is coupled to the processor, and stores a program instruction and data that are necessary for the apparatus.

According to an eighth aspect, an uplink information receiving apparatus is provided. The apparatus can implement a function executed by the network device in the method in the third aspect. The function may be implemented by hardware, or may be implemented by hardware executing corresponding software. The hardware or the software includes one or more units or modules corresponding to the function.

In a possible design, a structure of the apparatus includes a processor and a transceiver. The processor is configured to support the apparatus in executing the corresponding function in the method in the third aspect. The transceiver is configured to support communication between the apparatus and another network element. The apparatus may further include a memory. The memory is coupled to the processor, and stores a program instruction and data that are necessary for the apparatus.

According to a ninth aspect, an uplink information receiving apparatus is provided. The apparatus can implement a function executed by the network device in the method in the fourth aspect. The function may be implemented by hardware, or may be implemented by hardware executing corresponding software. The hardware or the software includes one or more units or modules corresponding to the function.

In a possible design, a structure of the apparatus includes a processor and a transceiver. The processor is configured to support the apparatus in executing the corresponding function in the method in the fourth aspect. The transceiver is configured to support communication between the apparatus and another network element. The apparatus may further include a memory. The memory is coupled to the processor, and stores a program instruction and data that are necessary for the apparatus.

According to a tenth aspect, an uplink information receiving apparatus is provided. The apparatus can implement a function executed by the network device in the method in the fifth aspect. The function may be implemented by hardware, or may be implemented by hardware executing corresponding software. The hardware or the software includes one or more units or modules corresponding to the function.

In a possible design, a structure of the apparatus includes a processor and a transceiver. The processor is configured to support the apparatus in executing the corresponding function in the method in the fifth aspect. The transceiver is configured to support communication between the apparatus and another network element. The apparatus may further include a memory. The memory is coupled to the processor, and stores a program instruction and data that are necessary for the apparatus.

According to an eleventh aspect, this application further provides a network system. The network system includes the uplink information sending apparatus in the sixth aspect and the uplink information receiving apparatus in the eighth aspect.

According to a twelfth aspect, this application further provides a network system. The network system includes the uplink information sending apparatus in the seventh aspect and the uplink information receiving apparatus in the ninth aspect.

According to a thirteenth aspect, this application further provides a network system. The network system includes the uplink information receiving apparatus in the tenth aspect and a transmit end that sends uplink information to the apparatus.

According to a fourteenth aspect, a computer readable storage medium is provided. The computer readable storage medium stores computer program code. When the computer program code is executed by a processing unit or a processor, a terminal device is enabled to perform the method in the first aspect.

According to a fifteenth aspect, a computer readable storage medium is provided. The computer readable storage medium stores computer program code. When the computer program code is executed by a processing unit or a processor, a terminal device is enabled to perform the method in the second aspect.

According to a sixteenth aspect, a computer readable storage medium is provided. The computer readable storage medium stores computer program code. When the computer program code is executed by a processing unit or a processor, a network device is enabled to perform the method in the third aspect.

According to a seventeenth aspect, a computer readable storage medium is provided. The computer readable storage medium stores computer program code. When the computer program code is executed by a processing unit or a processor, a network device is enabled to perform the method in the fourth aspect.

According to an eighteenth aspect, a computer readable storage medium is provided. The computer readable storage medium stores computer program code. When the computer program code is executed by a processing unit or a processor, a network device is enabled to perform the method in the fifth aspect.

According to a nineteenth aspect, a communications chip is provided. The communications chip stores an instruction. When the instruction runs on a terminal device, the communications chip is enabled to perform the method in the first aspect.

According to a twentieth aspect, a communications chip is provided. The communications chip stores an instruction. When the instruction runs on a terminal device, the communications chip is enabled to perform the method in the second aspect.

According to a twenty-first aspect, a communications chip is provided. The communications chip stores an instruction. When the instruction runs on a network device, the communications chip is enabled to perform the method in the third aspect.

According to a twenty-second aspect, a communications chip is provided. The communications chip stores an instruction. When the instruction runs on a network device, the communications chip is enabled to perform the method in the fourth aspect.

According to a twenty-third aspect, a communications chip is provided. The communications chip stores an instruction. When the instruction runs on a network device, the communications chip is enabled to perform the method in the fifth aspect.

According to a twenty-fourth aspect, a computer program product is provided. The computer program product includes computer program code. When the computer program code is run by a communications unit or transceiver of a terminal device and a processing unit or processor of the terminal device, the terminal device is enabled to perform the method in the first aspect.

According to a twenty-fifth aspect, a computer program product is provided. The computer program product includes computer program code. When the computer program code is run by a communications unit or transceiver of a terminal device and a processing unit or processor of the terminal device, the terminal device is enabled to perform the method in the second aspect.

According to a twenty-sixth aspect, a computer program product is provided. The computer program product includes computer program code. When the computer program code is run by a communications unit or transceiver of a network device and a processing unit or processor of the network device, the network device is enabled to perform the method in the third aspect.

According to a twenty-seventh aspect, a computer program product is provided. The computer program product includes computer program code. When the computer program code is run by a communications unit or transceiver of a network device and a processing unit or processor of the network device, the network device is enabled to perform the method in the fourth aspect.

According to a twenty-eighth aspect, a computer program product is provided. The computer program product includes computer program code. When the computer program code is run by a communications unit or transceiver of a network device and a processing unit or processor of the network device, the network device is enabled to perform the method in the fifth aspect.

According to a twenty-ninth aspect, a downlink control channel detection method is provided, including: determining, based on a transmission direction of a transmission resource and a preset downlink control resource set, a downlink control resource set used for detecting downlink control channels, where the transmission resource includes the preset downlink control resource set; and detecting a downlink control channel on the downlink control resource set used for detecting downlink control channels.

According to the method provided in this embodiment, the downlink control resource set used for detecting downlink control channels is a subset of the preset downlink control resource set, or the downlink control resource set used for detecting downlink control channels is a resource set determined by a terminal device based on a location of the preset downlink control resource set. In either case, the downlink control resource set used for detecting downlink control channels belongs to the transmission resource whose transmission direction is downlink transmission direction. The terminal device may determine, based on the transmission direction of the transmission resource and the preset downlink control resource set, the downlink control resource set used for detecting downlink control channels, so that the terminal device can be spared from detecting a downlink control channel on each configured downlink control resource set, thereby reducing power consumption of the terminal device.

Optionally, before the determining, based on a transmission direction of a transmission resource and a preset downlink control resource set, a downlink control resource set used for detecting downlink control channels, the method further includes: receiving fourth configuration information, where the fourth configuration information is used to configure the preset downlink control resource set.

The preset downlink control resource set may be preconfigured by the terminal device based on the fourth configuration information sent by a network device, and the fourth configuration information includes configuration information related to the preset downlink control resource set, for example, a parameter such as a time-frequency resource, thereby improving flexibility of detecting a downlink control channel.

Optionally, the preset downlink control resource set may be a transmission resource whose transmission direction is a downlink direction by default (for example, according to a communications protocol), and may be determined by the terminal device without receiving the configuration information sent by the network device.

Optionally, before the determining, based on a transmission direction of a transmission resource and a preset downlink control resource set, a downlink control resource set used for detecting downlink control channels, the method further includes: receiving second information, where the second information is used to indicate the transmission direction of the transmission resource, where the second information includes at least one piece of the following information: fifth indication information, where the fifth indication information is used to indicate the transmission direction of the transmission resource; and sixth indication information, where the sixth indication information is used to indicate the transmission direction of the transmission resource; and the fifth indication information and the sixth indication information are carried in different signaling.

The second information may be carried in different signaling, thereby improving flexibility and reliability of indicating the transmission direction of the transmission resource.

Optionally, the sixth indication information is carried in physical layer signaling, and the method further includes: receiving fifth configuration information, where the fifth configuration information is used to configure a third control resource set; and monitoring the sixth indication information on the third control resource set.

The terminal device may determine the third control resource set based on the fifth configuration information sent by the network device, where the third control resource set is used to transmit the sixth indication information; and the terminal device monitors the sixth indication information on the third control resource set, so that the terminal device is spared from monitoring the sixth indication information all the time, thereby reducing power consumption of the terminal device.

Optionally, the second information further includes seventh indication information, the seventh indication information is used to indicate a transmission direction of a flexible and variable resource in the transmission resource, and the method further includes: receiving sixth configuration information, where the sixth configuration information is used to configure a fourth control resource set; and monitoring the seventh indication information on the fourth control resource set.

The terminal device may determine the fourth control resource set based on the sixth configuration information sent by the network device, where the fourth control resource set is used to transmit the seventh indication information; and the terminal device monitors the seventh indication information on the fourth control resource set, so that the terminal device is spared from monitoring the seventh indication information all the time, thereby reducing power consumption of the terminal device.

Optionally, the downlink control resource set used for detecting downlink control channels is a transmission resource whose transmission direction is a downlink transmission direction in a time period corresponding to the preset downlink control resource set.

A configured downlink control resource set may overlap with a transmission resource used for uplink transmission, and consequently, cannot be used to transmit a downlink control channel. Therefore, the terminal device and the network device may separately determine, from a time period corresponding to the configured downlink control resource set, a downlink control resource set used for detecting downlink control channels, and detect a downlink control channel on the downlink control resource set used for detecting downlink control channels. According to the method provided in this embodiment, the terminal device may skip a downlink control resource set whose transmission direction is an uplink direction, and detect a downlink control channel only on a downlink control resource set whose transmission direction is a downlink direction, thereby reducing power consumption of the terminal device.

According to a thirtieth aspect, a downlink control channel sending method is provided, including: determining, based on a transmission direction of a transmission resource and a preset downlink control resource set, a downlink control resource set used for sending downlink control channels, where the preset transmission resource includes the downlink control resource set; and sending a downlink control channel on the downlink control resource set used for sending downlink control channels.

According to the method provided in this embodiment, the downlink control resource set used for sending downlink control channels is a subset of the preset downlink control resource set, or the downlink control resource set used for sending downlink control channels is a resource set determined by a network device based on a location of the preset downlink control resource set. In either case, the downlink control resource set used for sending downlink control channels belongs to the transmission resource whose transmission direction is downlink transmission direction. The network device may determine, based on the transmission direction of the transmission resource and the preset downlink control resource set, the downlink control resource set used for sending downlink control channels. A terminal device may also determine, based on the transmission direction of the transmission resource and the preset downlink control resource set, the downlink control resource set used for sending downlink control channels by the network device, so that the terminal device can be spared from detecting a downlink control channel on each configured downlink control resource set, thereby reducing power consumption of the terminal device.

Optionally, before the sending a downlink control channel on the downlink control resource set used for sending downlink control channels, the method further includes: sending fourth configuration information, where the fourth configuration information is used to configure the preset downlink control resource set.

The preset downlink control resource set may be a transmission resource whose transmission direction is a downlink direction by default (for example, according to a communications protocol), and the network device does not need to send the fourth configuration information to the terminal device. Alternatively, the preset downlink control resource set may be preconfigured based on the fourth configuration information sent by the network device, and the fourth configuration information includes configuration information related to the preset downlink control resource set, for example, a parameter such as a time-frequency resource, thereby improving flexibility of detecting a downlink control channel by the terminal device.

Optionally, before the sending a downlink control channel on the downlink control resource set used for sending downlink control channels, the method further includes: sending second information, where the second information is used to indicate the transmission direction of the transmission resource, where the second information includes at least one piece of the following information: fifth indication information, where the fifth indication information is used to indicate the transmission direction of the transmission resource; and sixth indication information, where the sixth indication information is used to indicate the transmission direction of the transmission resource; and the fifth indication information and the sixth indication information are carried in different signaling.

The second information may be carried in different signaling, thereby improving flexibility and reliability of indicating the transmission direction of the transmission resource.

Optionally, the sixth indication information is carried in physical layer signaling, and the method further includes: sending fifth configuration information, where the fifth configuration information is used to configure a third control resource set.

The network device configures the third control resource set for the terminal device by using the fifth configuration information, and the terminal device monitors the sixth indication information on the third control resource set, so that the terminal device is spared from monitoring the sixth indication information all the time, thereby reducing power consumption of the terminal device.

Optionally, the second information further includes seventh indication information, the seventh indication information is used to indicate a transmission direction of a flexible and variable resource in the transmission resource, and the method further includes: sending sixth configuration information, where the sixth configuration information is used to configure a fourth control resource set.

The network device may configure the fourth control resource set for the terminal device by using the sixth configuration information, and the terminal device monitors the seventh indication information on the fourth control resource set, so that the terminal device is spared from monitoring the seventh indication information all the time, thereby reducing power consumption of the terminal device.

Optionally, the downlink control resource set used for sending downlink control channels is a transmission resource whose transmission direction is a downlink transmission direction in a time period corresponding to the preset downlink control resource set.

A configured downlink control resource set may overlap with a transmission resource used for uplink transmission, and consequently, cannot be used to transmit a downlink control channel. Therefore, the terminal device and the network device may separately determine, from a time period corresponding to the configured downlink control resource set, a downlink control resource set used for detecting downlink control channels, and detect a downlink control channel on the downlink control resource set used for detecting downlink control channels. According to the method provided in this embodiment, the terminal device may skip a downlink control resource set whose transmission direction is an uplink direction, and detect a downlink control channel only on a downlink control resource set whose transmission direction is a downlink direction, thereby reducing power consumption of the terminal device.

According to a thirty-first aspect, a downlink control channel sending method is provided, including: sending second information, where the second information is used to indicate a transmission direction of a transmission resource, and the transmission direction includes a downlink transmission direction; sending fourth configuration information, where the fourth configuration information is used to configure a downlink control resource set, and the downlink control resource set is a subset of a transmission resource whose transmission direction is the downlink transmission direction; and sending a downlink control channel on the downlink control resource set.

According to the method provided in this embodiment, the control resource set configured by a network device by using the fourth configuration information is a subset of the transmission resource whose transmission direction is the downlink direction, and the network device does not need to indicate whether the control resource set is available, thereby reducing signaling overheads.

Optionally, before the sending fourth configuration information, the method further includes: determining the downlink control resource set based on the transmission direction of the transmission resource.

The network device may first determine the transmission direction of the transmission resource, and then determine the downlink control resource set, so that the downlink control resource set configured by using the fourth configuration information is a subset of the transmission resource whose transmission direction is the downlink direction.

Optionally, before the sending second information, the method further includes: determining the transmission direction of the transmission resource based on the downlink control resource set.

Alternatively, the network device may first determine the downlink control resource set, and then determine the transmission direction of the transmission resource, so that the downlink control resource set configured by using the fourth configuration information is a subset of the transmission resource whose transmission direction is the downlink direction.

According to a thirty-second aspect, a downlink control channel detection apparatus is provided. The apparatus can implement a function executed by the terminal device in the method in the twenty-ninth aspect. The function may be implemented by hardware, or may be implemented by hardware executing corresponding software. The hardware or the software includes one or more units or modules corresponding to the function.

In a possible design, a structure of the apparatus includes a processor and a transceiver. The processor is configured to support the apparatus in executing the corresponding function in the method in the twenty-ninth aspect. The transceiver is configured to support communication between the apparatus and another network element. The apparatus may further include a memory. The memory is coupled to the processor, and stores a program instruction and data that are necessary for the apparatus.

According to a thirty-third aspect, a downlink control channel sending apparatus is provided. The apparatus can implement a function executed by the network device in the method in the thirtieth aspect. The function may be implemented by hardware, or may be implemented by hardware executing corresponding software. The hardware or the software includes one or more units or modules corresponding to the function.

In a possible design, a structure of the apparatus includes a processor and a transceiver. The processor is configured to support the apparatus in executing the corresponding function in the method in the thirtieth aspect. The transceiver is configured to support communication between the apparatus and another network element. The apparatus may further include a memory. The memory is coupled to the processor, and stores a program instruction and data that are necessary for the apparatus.

According to a thirty-fourth aspect, a downlink control channel sending apparatus is provided. The apparatus can implement a function executed by the network device in the method in the thirty-first aspect. The function may be implemented by hardware, or may be implemented by hardware executing corresponding software. The hardware or the software includes one or more units or modules corresponding to the function.

In a possible design, a structure of the apparatus includes a processor and a transceiver. The processor is configured to support the apparatus in executing the corresponding function in the method in the thirty-first aspect. The transceiver is configured to support communication between the apparatus and another network element. The apparatus may further include a memory. The memory is coupled to the processor, and stores a program instruction and data that are necessary for the apparatus.

According to a thirty-fifth aspect, this application further provides a network system. The network system includes the downlink control channel detection apparatus in the thirty-second aspect and the downlink control channel sending apparatus in the thirty-third aspect.

According to a thirty-sixth aspect, this application further provides a network system. The network system includes the downlink control channel sending apparatus in the thirty-fourth aspect and a receive end that detects a downlink control channel sent by the apparatus.

According to a thirty-seventh aspect, a computer readable storage medium is provided. The computer readable storage medium stores computer program code. When the computer program code is executed by a processing unit or a processor, a terminal device is enabled to perform the method in the twenty-ninth aspect.

According to a thirty-eighth aspect, a computer readable storage medium is provided. The computer readable storage medium stores computer program code. When the computer program code is executed by a processing unit or a processor, a terminal device is enabled to perform the method in the thirtieth aspect.

According to a thirty-ninth aspect, a computer readable storage medium is provided. The computer readable storage medium stores computer program code. When the computer program code is executed by a processing unit or a processor, a terminal device is enabled to perform the method in the thirty-first aspect.

According to a fortieth aspect, a communications chip is provided. The communications chip stores an instruction. When the instruction runs on a terminal device, the communications chip is enabled to perform the method in the twenty-ninth aspect.

According to a forty-first aspect, a communications chip is provided. The communications chip stores an instruction. When the instruction runs on a network device, the communications chip is enabled to perform the method in the thirtieth aspect.

According to a forty-second aspect, a communications chip is provided. The communications chip stores an instruction. When the instruction runs on a network device, the communications chip is enabled to perform the method in the thirty-first aspect.

According to a forty-third aspect, a computer program product is provided. The computer program product includes computer program code. When the computer program code is run by a communications unit or transceiver of a terminal device and a processing unit or processor of the terminal device, the terminal device is enabled to perform the method in the twenty-ninth aspect.

According to a forty-fourth aspect, a computer program product is provided. The computer program product includes computer program code. When the computer program code is run by a communications unit or transceiver of a network device and a processing unit or processor of the network device, the network device is enabled to perform the method in the thirtieth aspect.

According to a forty-fifth aspect, a computer program product is provided. The computer program product includes computer program code. When the computer program code is run by a communications unit or transceiver of a network device and a processing unit or processor of the network device, the network device is enabled to perform the method in the thirty-first aspect.

BRIEF DESCRIPTION OF DRAWINGS

FIG. 1 is a schematic diagram of a communications system to which embodiments of this application are applicable;

FIG. 2 is a schematic diagram of an uplink information sending method according to an embodiment of this application;

FIG. 5 is a schematic diagram of still another uplink information sending method according to an embodiment of this application;

FIG. 6 is a schematic diagram of still another uplink information sending method according to an embodiment of this application;

FIG. 7 is a schematic diagram of still another uplink information sending method according to an embodiment of this application;

FIG. 8 is a schematic diagram of an uplink information receiving method according to an embodiment of this application;

FIG. 12 is a schematic diagram of still another uplink information receiving method according to an embodiment of this application;

FIG. 13 is a schematic diagram of still another uplink information receiving method according to an embodiment of this application;

FIG. 14 is a schematic diagram of a downlink control channel detection method according to an embodiment of this application;

FIG. 15 is a schematic diagram of a downlink control channel sending method according to an embodiment of this application;

FIG. 16 is a schematic diagram of another downlink control channel sending method according to an embodiment of this application;

DESCRIPTION OF EMBODIMENTS

Figure 3:
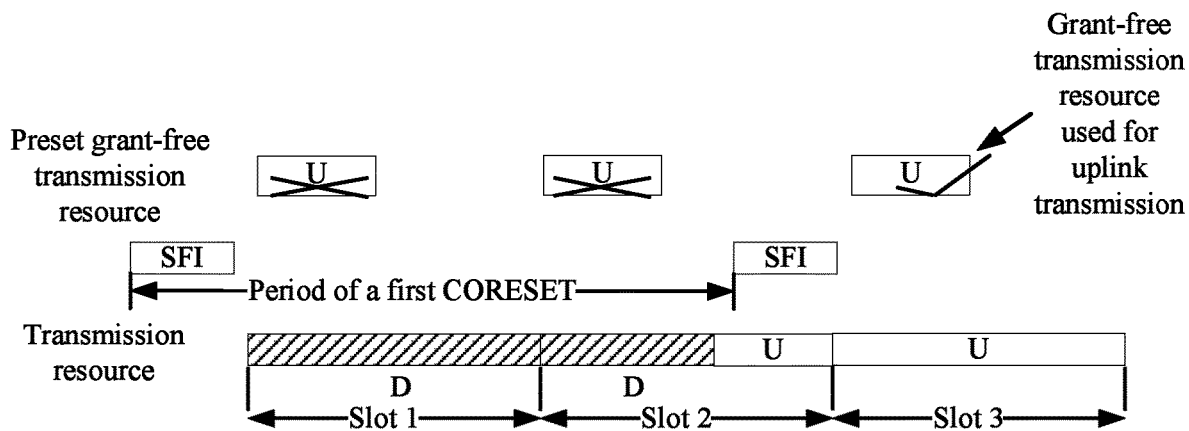
FIG. 3 is a schematic diagram of another uplink information sending method according to an embodiment of this application.

The following describes technical solutions in this application with reference to the accompanying drawings.

FIG. 1 shows a communications system to which this application is applicable. The communications system includes a network device and a terminal device. The network device communicates with the terminal device through a wireless network. When the terminal device sends information, a wireless communications module of the terminal device may obtain information bits to be sent to the network device through a channel. These information bits are, for example, information bits generated by a processing module of the terminal device, or received from another device, or stored in a storage module of the terminal device.

In this application, the terminal device may also be referred to as an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a handheld device or computing device with a wireless communication function, another processing device connected to a wireless modem, a vehicle-mounted device, a wearable device, or user equipment in a 5G communications system.

The network device may be a base transceiver station (BTS) in a code division multiple access (CDMA) system, or may be a NodeB (NB) in a wideband code division multiple access (WCDMA) system, or may be an evolved NodeB (evolved node B, eNB) in a long term evolution (LTE) system, or may be a gNB (g NodeB) in a 5G communications system. The foregoing base stations are merely examples for description. The network device may be alternatively a relay station, an access point, a vehicle-mounted device, a wearable device, or another type of device.

The communications system to which this application is applicable is merely an example for description. The communications system to which this application is applicable is not limited thereto. For example, the communications system may alternatively include other quantities of network devices and terminal devices.

FIG. 2 is a schematic diagram of an uplink information sending method according to this application. The method 200 includes the following steps.

S201. Determine, based on a transmission direction of a transmission resource and a preset grant-free transmission resource, a grant-free transmission resource used for uplink transmission, where the transmission resource includes the grant-free transmission resource.

S202. Send uplink information on the grant-free transmission resource used for uplink transmission.

The method 200 is performed by, for example, a terminal device.

In the method 200, the terminal device may determine the transmission direction of the transmission resource based on preset information. For example, the terminal device may determine the transmission direction of the transmission resource according to a communications protocol. Alternatively, the terminal device may determine the transmission direction of the transmission resource according to an indication from a network device. The transmission direction of the transmission resource includes an uplink transmission direction, and the transmission direction of the transmission resource may further include a downlink transmission direction.

The preset grant-free transmission resource may be a resource defined in the communications protocol, or may be a resource preconfigured by the network device. A transmission direction of each preset grant-free transmission resource is the uplink transmission direction. When the preset grant-free transmission resource completely or partially overlaps with a transmission resource whose transmission direction is the downlink transmission direction, the preset grant-free transmission resource cannot be used. When the preset grant-free transmission resource is completely located in a transmission resource whose transmission direction is the uplink transmission direction, the preset grant-free transmission resource can be used.

When the terminal device determines, based on first information, that a resource (for example, a first resource) in preset grant-free transmission resources cannot be used, the terminal device may search for an available grant-free transmission resource after the first resource, in other words, determine the grant-free transmission resource used for uplink transmission.

The grant-free transmission resource used for uplink transmission may be a subset of the preset grant-free transmission resource or may be a resource determined based on a location of the preset grant-free transmission resource. In either case, the grant-free transmission resource used for uplink transmission belongs to a transmission resource whose transmission direction is uplink transmission direction. The terminal device may determine, based on the transmission direction of the transmission resource and the preset grant-free transmission resource, the grant-free transmission resource used for uplink transmission, thereby avoiding a grant-free transmission failure caused when a transmission direction of a preset grant-free transmission resource is inconsistent with a transmission direction of a transmission resource.

Optionally, before the determining, based on a transmission direction of a transmission resource and a preset grant-free transmission resource, a grant-free transmission resource used for uplink transmission, the method 200 further includes the following step:

S203. Receive first configuration information, where the first configuration information is used to configure the preset grant-free transmission resource.

The preset grant-free transmission resource may be preconfigured by the terminal device based on the first configuration information sent by the network device, thereby improving flexibility of grant-free transmission.

Optionally, the first information includes at least one piece of the following information: first indication information, where the first indication information is used to indicate the transmission direction of the transmission resource; and second indication information, where the second indication information is used to indicate the transmission direction of the transmission resource; and the first indication information and the second indication information are carried in different signaling.

Optionally, the first indication information is radio resource control (RRC) signaling, and the second indication information is downlink control information (DCI).

In this application, the first information may be one piece of information or a plurality of pieces of information, and any information used to indicate the transmission direction of the transmission resource may be referred to as the first information.

For example, the first information is a slot format indicator information (SFI). The SFI may indicate which symbols in a slot are used for uplink transmission and which symbols are used for downlink transmission. The SFI may further indicate which symbols are interval symbols, which symbols are used for interference measurement, and the like. Optionally, the first information may indicate a same slot format of a plurality of slots, or the first information indicates different slot formats corresponding to a plurality of slots. A transmission resource time length indicated by the first information is not limited in this application.

The first information may be carried in different signaling, thereby improving flexibility and reliability of indicating the transmission direction of the transmission resource.

Optionally, the second indication information is carried in physical layer signaling, and the method 200 further includes the following steps:

S204. Receive second configuration information, where the second configuration information is used to configure a first control resource set (CORESET).

S205. Monitor the second indication information on the first CORESET.

The terminal device may determine the first CORESET based on the second configuration information sent by the network device, where the first CORESET is used to transmit the second indication information; and the terminal device monitors the second indication information on the first CORESET, so that the terminal device is spared from detecting the second indication information on each symbol or in each slot or each subframe, thereby reducing power consumption of the terminal device. The first CORESET is not only used to transmit the second indication information, but also may be used to transmit other information. Optionally, the terminal device may monitor the second indication information on a subset of the first CORESET based on configuration information of the network device.

FIG. 3 is a schematic diagram of another uplink information sending method according to this application.

As shown in FIG. 3, "D" indicates that a transmission direction is a downlink transmission direction, "U" indicates that a transmission direction is an uplink transmission direction, an identifier "x" in the figure indicates that a resource is unavailable, and an identifier "✓" indicates that a resource is available. A network device configures a first CORESET by using second configuration information, and sends a SFI by using the first CORESET, where the SFI is equivalent to second indication information. A terminal device monitors the SFI on the first CORESET. When the SFI received by the terminal device indicates that a slot 1 is used for downlink transmission and the first half of a slot 2 is used for downlink transmission, the terminal device determines that first two resources in preset grant-free transmission resources cannot be used, and if a slot 3 is used for uplink transmission, determines that the 3rd resource in the preset grant-free transmission resources can be used, thereby determining a grant-free transmission resource used for transmitting uplink information, and sending uplink information on the grant-free transmission resource used for transmitting uplink information.

Correspondingly, the network device may also determine, based on transmission directions of the slot 1, the slot 2, and the slot 3 and the preset grant-free transmission resource, a grant-free transmission resource used for uplink transmission, and receive the uplink information on the grant-free transmission resource used for transmitting uplink information.

Optionally, the first information further includes third indication information, the third indication information is used to indicate a transmission direction of a flexible and variable resource in the transmission resource, and the method 200 further includes the following steps:

S206. Receive third configuration information, where the third configuration information is used to configure a second CORESET.

S207. Monitor the third indication information on the second CORESET.

The terminal device may determine the second CORESET based on the third configuration information sent by the network device, where the second CORESET is used to transmit the third indication information; and the terminal device monitors the third indication information on the second CORESET, so that the terminal device is spared from monitoring the third indication information all the time, thereby reducing power consumption of the terminal device. The second CORESET is not only used to transmit the third indication information, but also may be used to transmit other information.

It should be understood that the second CORESET may be the same as or different from the first CORESET. Correspondingly, the third configuration information may be the same as or different from the second configuration information.

Figure 4:
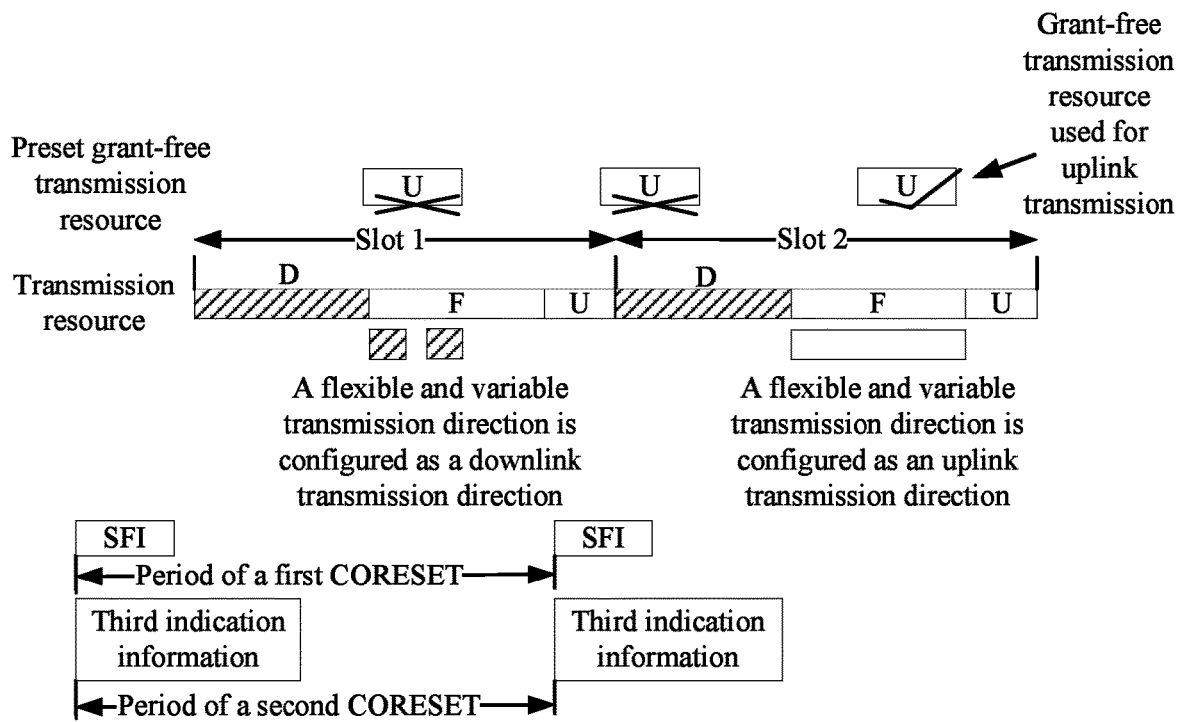
FIG. 4 is a schematic diagram of still another uplink information sending method according to an embodiment of this application.

FIG. 4 is a schematic diagram of still another uplink information sending method according to this application.

As shown in FIG. 4, "D" indicates that a transmission direction is a downlink transmission direction, "U" indicates that a transmission direction is an uplink transmission direction, "F" indicates that a transmission direction is a flexible and variable transmission direction, an identifier "x" in the figure indicates that the resource is unavailable, and an identifier "✓" indicates that the resource is available. A network device configures a first CORESET by using second configuration information, and sends a SFI by using the first CORESET. A network device further configures a second CORESET by using third configuration information, and sends third indication information by using the second CORESET. A terminal device respectively monitors the SFI on the first CORESET, and monitors the third indication information on the second CORESET.

A transmission direction of a flexible and variable resource corresponding to the $1^{st}$ resource in preset grant-free transmission resources is the downlink transmission direction, and therefore the $1^{st}$ resource is unavailable. The $2^{nd}$ resource in the preset grant-free transmission resources corresponds to a transmission resource whose transmission direction is the downlink transmission direction, and therefore the $2^{nd}$ resource is also unavailable. A transmission direction of a flexible and variable resource corresponding to the 3rd resource in the preset grant-free transmission resources is the uplink transmission direction, and therefore the third resource is available and is a grant-free transmission resource used for transmitting uplink information. The terminal device may send uplink information on the grant-free transmission resource used for transmitting uplink information.

Correspondingly, the network device may also determine, in the foregoing method, that the third resource in the preset grant-free transmission resources is a grant-free transmission resource used for transmitting uplink information, and receive, on the third resource, the uplink information sent by the terminal device.

Optionally, the determining, based on a transmission direction of a transmission resource and a preset grant-free transmission resource, a grant-free transmission resource used for uplink transmission includes the following steps:

S208: Receive fourth indication information, where the fourth indication information is used to indicate an offset of the preset grant-free transmission resource.

S209. Determine, based on the transmission direction of the transmission resource, the preset grant-free transmission resource, and the fourth indication information, the grant-free transmission resource used for uplink transmission.

When a transmission resource used for downlink transmission conflicts with the preset grant-free transmission resource, the terminal device may determine the offset of the preset grant-free transmission resource based on the fourth indication information sent by the network device, and determine, based on the offset, a location of the preset grant-free transmission resource, and the transmission direction of the transmission resource, a location of the grant-free transmission resource used for uplink transmission, thereby avoiding a grant-free transmission failure caused when a transmission direction of a grant-free transmission resource is inconsistent with a transmission direction of a transmission resource.

For example, if the offset indicated by the fourth indication information is seven downlink symbols, the terminal device needs to determine a transmission direction of a transmission resource after a time-domain reference location, and skip seven downlink symbols starting from the time-domain reference location to send uplink information. The time-domain reference location may be a location of a time-domain symbol of the preset grant-free transmission resource.

Optionally, the grant-free transmission resource used for uplink transmission is a transmission resource whose transmission direction is the uplink transmission direction in a time period corresponding to the preset grant-free transmission resource.

The terminal device needs to determine, based on a transmission direction of a transmission resource in a time period corresponding to a grant-free transmission resource, whether the grant-free transmission resource is available. When a transmission resource in the time period corresponding to the grant-free transmission resource is used for uplink transmission, the grant-free transmission resource is available. When a transmission resource in the time period corresponding to the grant-free transmission resource is used for downlink transmission, the grant-free transmission resource is unavailable. For example, when a first resource in grant-free transmission resources is unavailable, the terminal device may determine an available second resource from the transmission resources, and use the second resource as the grant-free transmission resource used for uplink transmission. The second resource may be a grant-free transmission resource in preset grant-free transmission resources that is after the first resource, or the second resource may be an available transmission resource in a time period (for example, a slot) corresponding to the first resource. According to the method provided in this embodiment, a grant-free transmission failure caused when a transmission direction of a preset grant-free transmission resource is inconsistent with a transmission direction of a transmission resource can be avoided. When the second resource is an available transmission resource in the time period corresponding to the first resource, the terminal device may send uplink information on a resource other than the preset grant-free transmission resource, thereby reducing a latency in sending the uplink information.

For example, as shown in FIG. 3, the terminal device determines that a third resource in preset grant-free transmission resources is a grant-free transmission resource used for uplink transmission. Assuming that the third resource occupies a symbol 0 to a symbol 5 in a slot 3, the third resource is a transmission resource on the symbol 0 to the symbol 5 in the slot 3 (namely, a time period corresponding to a preset grant-free transmission resource).

The time period corresponding to the preset grant-free transmission resource may also be understood as the slot 3. The following uses another example to describe this case.

FIG. 5 is a schematic diagram of still another uplink information sending method according to this application.

As shown in FIG. 5, "D" indicates that a transmission direction is a downlink transmission direction, and "U" indicates that a transmission direction is an uplink transmission direction. A network device configures a first CORESET by using second configuration information, and sends a SFI by using the first CORESET, where the SFI is equivalent to second indication information. A terminal device monitors the SFI on the first CORESET. The SFI received by the terminal device indicates that a slot 1 is used for downlink transmission and the first half of a slot 2 is used for downlink transmission. Because all symbols in the slot 1 are used for downlink transmission, that is, a quantity of uplink symbols in the slot 1 is less than a minimum quantity of symbols required by the terminal device to perform grant-free transmission, a transmission resource corresponding to the slot 1 is an invalid resource and cannot be adapted in the slot 1.

A transmission direction of the second half of the slot 2 is an uplink transmission direction, and a transmission resource corresponding to the second half of the slot 2 meets a requirement for grant-free transmission. Therefore, the terminal device may determine that the transmission resource corresponding to the second half of the slot 2 is a grant-free transmission resource used for uplink transmission, and send uplink information on the grant-free transmission resource used for transmitting uplink information. If a quantity of uplink symbols in the slot 2 is not enough to meet grant-free transmission but is approximate to a quantity of uplink symbols required for grant-free transmission, the terminal device may determine, based on preset information, to use a relatively large frequency band to perform grant-free transmission.

For a slot 3, a transmission resource corresponding to a plurality of uplink symbols may be used as a grant-free transmission resource used for uplink transmission, and the terminal device may determine, based on an identifier of the terminal device, to send uplink information on a corresponding symbol. In other words, the terminal device may determine, based on the identifier of the terminal device, an adaptation location (namely, a location of an uplink symbol) of the grant-free transmission resource used for uplink transmission. A correspondence between the identifier of the terminal device and the adaptation location may be configured by the network device, or may be specified in a communications protocol.

Correspondingly, the network device may also determine, based on transmission directions of the slot 1 and the slot 2, and a preset grant-free transmission resource, that the transmission resource corresponding to the second half of the slot 2 is a grant-free transmission resource used for uplink transmission, and receive the uplink information on the grant-free transmission resource used for transmitting uplink information.

It should be understood that "a transmission resource corresponding to the second half of the slot 2 meets a requirement for grant-free transmission" in the foregoing description means that a transmission capability of the transmission resource corresponding to the second half of the slot 2 meets the requirement for grant-free transmission. For example, if duration of the second half of the slot 2 is less than that of the $2^{nd}$ resource in preset grant-free transmission resources but bandwidth corresponding to the second half of the slot 2 is relatively high, it may be considered that the transmission resource corresponding to the second half of the slot 2 meets the requirement for grant-free transmission. For another example, if bandwidth corresponding to the second half of the slot 2 is relatively low but duration of the second half of the slot 2 is greater than duration of the $2^{nd}$ resource in preset grant-free transmission resources, it may be considered that the transmission resource corresponding to the second half of the slot 2 meets the requirement for grant-free transmission.

FIG. 6 shows still another uplink information sending method according to this application. The method 600 includes the following steps:

S601. Receive first configuration information, where the first configuration information is used to configure a grant-free transmission resource.

S602. Receive second configuration information, where the second configuration information is used to configure a first control resource set.

S603. Monitor fourth indication information on the first control resource set, where the fourth indication information is used to indicate an offset of the grant-free transmission resource configured by using the first configuration information.

S604. Determine, based on the offset indicated by the monitored fourth indication information and the grant-free transmission resource configured by using the first configuration information, a grant-free transmission resource used for uplink transmission.

S605. Send uplink information on the grant-free transmission resource used for uplink transmission.

The method 600 is performed by, for example, a terminal device. There is no sequence between S601 and S602.

For example, if the offset indicated by the fourth indication information is seven symbols, the terminal device may skip seven symbols starting from a time-domain reference location to send uplink information. It is assumed that the terminal device receives the fourth indication information on a symbol 0, and the time-domain reference location may be a start location of the $1^{st}$ resource that is in grant-free transmission resources configured by using the first configuration information and that is after the symbol 0. The foregoing method is merely an example for description. In this application, a method for determining the time-domain reference location is not limited. For example, the time-domain reference location may be alternatively a location of a fixed symbol in a subframe or a slot.

According to the method provided in this embodiment, the terminal device may determine the offset of the grant-free transmission resource based on the fourth indication information, and determine, based on an initial location of the grant-free transmission resource and the offset, the grant-free transmission resource used for uplink transmission, thereby avoiding a grant-free transmission failure caused when a transmission direction of a grant-free transmission resource is inconsistent with a transmission direction of a transmission resource. In addition, the terminal device does not need to determine a transmission direction of a transmission resource after the time-domain reference location. Therefore, the method provided in this embodiment is easy to implement, reducing complexity of sending uplink information by the terminal device.

Optionally, the offset is used to determine a start location at which the grant-free transmission resource configured by using the first configuration information is activated or deactivated, or the offset is used to determine a location of the grant-free transmission resource after the fourth indication information is received.

The grant-free transmission resource configured by using the first configuration information may be a resource in an activated state or a deactivated state. To be specific, when a grant-free transmission resource is in the activated state, the terminal device may perform grant-free transmission by using the grant-free transmission resource. When a grant-free transmission resource is in the deactivated state, the terminal device cannot perform grant-free transmission by using the grant-free transmission resource. A network device may indicate, by using the fourth indication information, a status of the grant-free transmission resource configured by using the first configuration information.

For example, if the time-domain reference location is a symbol 0, and the offset indicated by the fourth indication information is seven symbols, the terminal device may determine that a grant-free transmission resource after a symbol 7 is a grant-free transmission resource in the activated state. For another example, if the time-domain reference location is a symbol 0, and the offset indicated by the fourth indication information is 13 symbols, the terminal device may determine that a grant-free transmission resource after a symbol 13 is a grant-free transmission resource in the deactivated state.

Whether a grant-free transmission resource that is indicated by the fourth indication information and that is after a specific time-domain location is in the activated state or the deactivated state may be indicated by other indication information, and the network device may further indicate, by using the other indication information, which grant-free transmission resource is in the activated state or the deactivated state.

For example, if the time-domain reference location is a symbol 0, the offset indicated by the fourth indication information is seven symbols, and a quantity indicated by quantity indication information is 2, the terminal device may determine that two grant-free transmission resources after a symbol 7 are in the activated state or the deactivated state.

A location determined by the terminal device based on the offset may be the start location at which the grant-free transmission resource is activated or deactivated, or may be a specific location of the grant-free transmission resource, so that the grant-free transmission resource used for sending uplink information can be flexibly determined.

FIG. 7 shows still another uplink information sending method according to this application.

As shown in FIG. 7, a network device first configures a grant-free transmission resource and a first CORESET for a terminal device by using first configuration information and second configuration information, and then sends fourth indication information by using the first CORESET, where the fourth indication information is, for example, physical layer signaling.

The fourth indication information is used to indicate an offset of a first resource (namely, the $1^{st}$ resource in grant-free transmission resources configured by using the first configuration information), or the fourth indication information is used to indicate that a first resource is activated or deactivated. FIG. 7 shows the offset that is of the first resource and that is indicated by the fourth indication information. The terminal device may determine, based on the offset and a location of the first resource, a grant-free transmission resource used for uplink transmission that is shown in a dashed-line block in FIG. 7, so that the terminal device may send uplink information on the grant-free transmission resource used for uplink transmission.

It should be understood that the offset indicated by the fourth indication information may be a non-zero value (which may be a negative value or a positive value), or may be zero. When the network device determines that an offset of the grant-free transmission resource configured by using the first configuration information is zero, the network device may choose to send the fourth indication information, or may choose not to send the fourth indication information. If the terminal device does not detect the fourth indication information, the terminal device sends the uplink information on the grant-free transmission resource configured by using the first configuration information.

It should be further understood that, locations of various resources and information shown in the foregoing schematic diagrams represent only a time-domain relationship between the resources and the information, and the foregoing schematic diagrams should not be understood as sizes of time-frequency resources actually occupied by the resources and the information.

FIG. 8 shows an uplink information receiving method according to this application. The method 800 includes the following steps:

5801. Send first information, where the first information is used to indicate a transmission direction of a transmission resource, and the transmission direction includes an uplink transmission direction.

5802. Send first configuration information, where the first configuration information is used to configure a grant-free transmission resource, and the grant-free transmission resource is a subset of a transmission resource whose transmission direction is the uplink transmission direction.

5803. Receive uplink information on the grant-free transmission resource.

According to the method provided in this embodiment, the grant-free transmission resource configured by a network device by using the first configuration information is a subset of the transmission resource whose transmission direction is the uplink transmission direction. The network device does not need to indicate an offset of the grant-free transmission resource, and does not need to indicate whether the grant-free transmission resource is available, thereby reducing signaling overheads.

Optionally, before the sending first configuration information, the method 800 further includes the following step:

5804. Determine the grant-free transmission resource based on the transmission direction of the transmission resource.

The network device may first determine the transmission direction of the transmission resource, and then determine the grant-free transmission resource, so that the grant-free transmission resource configured by using the first configuration information is a subset of the transmission resource whose transmission direction is the uplink direction.

Optionally, before the sending first information, the method 800 further includes the following step:

5805. Determine the transmission direction of the transmission resource based on the grant-free transmission resource.

Alternatively, the network device may first determine the grant-free transmission resource, and then determine the transmission direction of the transmission resource, so that the grant-free transmission resource configured by using the first configuration information is a subset of the transmission resource whose transmission direction is the uplink direction.

When the grant-free transmission resource in the method 800 is a grant-free transmission resource that can be used without being activated, the transmission direction of the transmission resource configured as the grant-free transmission resource cannot be changed to a downlink transmission direction or a flexible and variable transmission direction or another transmission direction, where the another transmission direction means that a time domain resource corresponding to the transmission resource is used for separating uplink transmission from downlink transmission.

When the grant-free transmission resource in the method 800 is a grant-free transmission resource that needs to be activated for use, if the grant-free transmission resource is not activated, the transmission direction of the transmission resource configured as the grant-free transmission resource can be modified. If the grant-free transmission resource is activated, the transmission direction of the transmission resource configured as the grant-free transmission resource cannot be modified.

Figure 9:
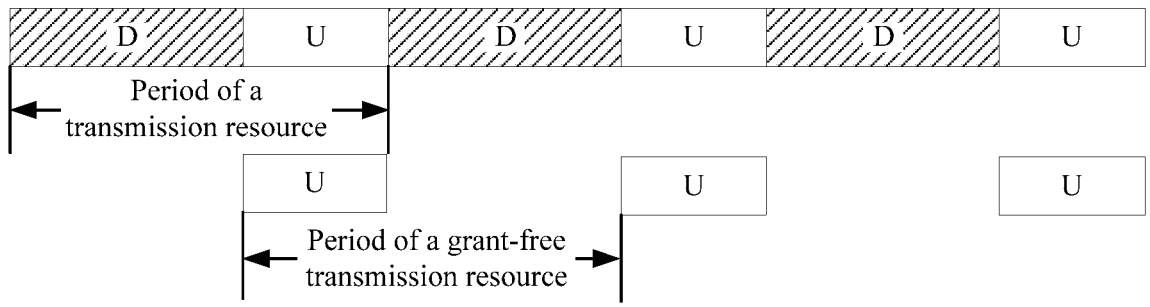
FIG. 9 is a schematic diagram of another uplink information receiving method according to an embodiment of this application.

FIG. 9 shows another uplink information receiving method according to this application. A grant-free transmission resource shown in FIG. 9 is equivalent to the foregoing preset grant-free transmission resource.

As shown in FIG. 9, "D" indicates that a transmission direction is a downlink transmission direction, and "U" indicates that a transmission direction is an uplink transmission direction. A transmission direction of a transmission resource is periodic, and a grant-free transmission resource is also periodic. First information and first configuration information each include a parameter indicating a period.

For example, a network device may indicate, by using the first information, a time interval at which a transmission resource whose transmission direction is the uplink transmission direction appears, or a network device may indicate, by using the first information, a time interval at which a transmission resource whose transmission direction is the uplink transmission direction and a transmission resource whose transmission direction is the downlink transmission direction appear. The first configuration information indicates a time interval at which a grant-free transmission resource appears.

It should be understood that, locations of the transmission resource and the grant-free transmission resource shown in FIG. 9 represent only a time-domain relationship between the two types of resources, but a frequency-domain relationship between the two types of resources is not limited.

The network device may first determine transmission directions of transmission resources, and then determine the grant-free transmission resource from the transmission resource whose transmission direction is the uplink transmission direction.

For example, each slot shown in FIG. 9 includes 14 symbols, where first 10 symbols are downlink symbols, the 11th symbol is an interval symbol, and the 12th symbol to the 14th symbol are uplink symbols. By default, the network device constructs a resource pool by using the 12th symbol to the 14th symbol in each slot, and indicates the grant-free transmission resource from the resource pool when sending the first configuration information.

A period of the grant-free transmission resource shown in FIG. 9 is the same as a period of the transmission direction of the transmission resource. Optionally, the period of the grant-free transmission resource may be different from the period of the transmission direction of the transmission resource.

Figure 10:
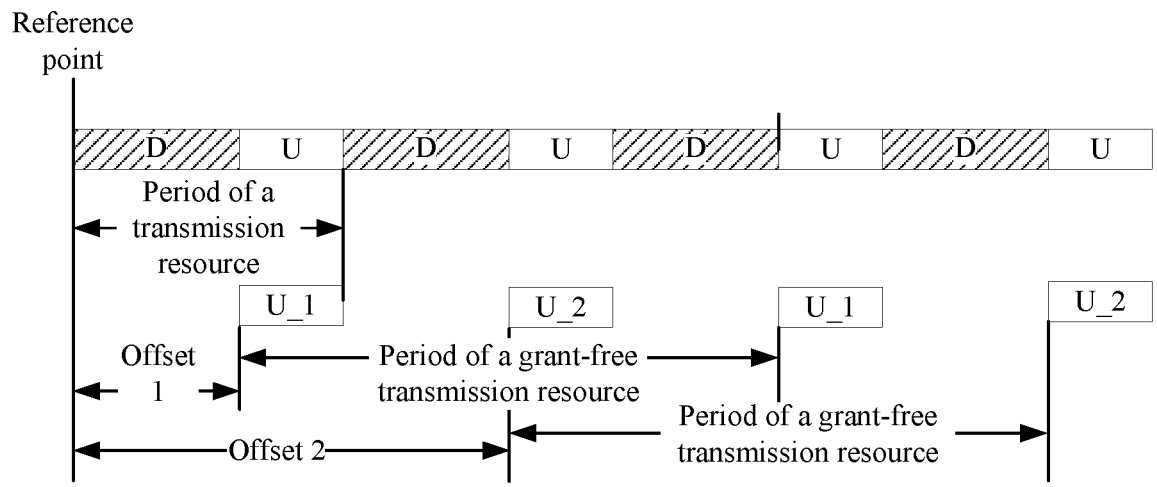
FIG. 10 is a schematic diagram of still another uplink information receiving method according to an embodiment of this application.

FIG. 10 shows still another uplink information receiving method according to this application.

As shown in FIG. 10, a network device indicates two types of grant-free transmission resources in a resource pool that includes transmission resources whose transmission directions are the uplink transmission direction, where U_1 represents a first grant-free transmission resource and is allocated to a first terminal device for use, and U 2 represents a second grant-free transmission resource and is allocated to a second terminal device for use. For either of the first terminal device and the second terminal device, a period of a transmission direction of a transmission resource is different from a period of a grant-free transmission resource.

In the method shown in FIG. 10, in addition to separately indicating periods of the two types of grant-free transmission resources, the network device may separately indicate specific locations of the two types of grant-free transmission resources by using a reference point and two different offsets.

In the methods shown in FIG. 9 and FIG. 10, the network device configures only one type of uplink transmission resource and one type of downlink transmission resource in one period. Optionally, the network device may configure a plurality of types of uplink transmission resources and/or a plurality of types of downlink transmission resources in one period.

Figure 11:
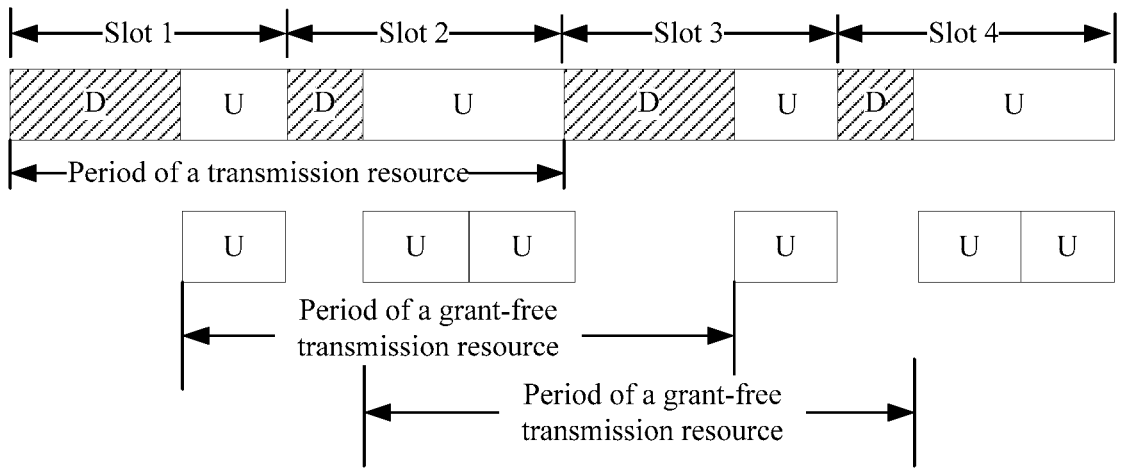
FIG. 11 is a schematic diagram of still another uplink information receiving method according to an embodiment of this application.

FIG. 11 shows still another uplink information receiving method according to this application.

As shown in FIG. 11, two types of uplink transmission resources and two types of downlink transmission resources are included in each period of a transmission resource. Time lengths of the two types of uplink transmission resources are different, and time lengths of the two types of downlink transmission resources are also different. The two types of uplink transmission resources form a resource pool. A network device may allocate all of the resource pool as grant-free transmission resources to a terminal device for use, or allocate an uplink transmission resource with a shorter time length in the resource pool as a first grant-free transmission resource to a terminal device for use, and allocate an uplink transmission resource with a longer time length in the resource pool as a second grant-free transmission resource to another terminal device for use.

FIG. 12 shows still another uplink information receiving method according to this application. The method 1200 includes the following steps:

S1201. Determine, based on a transmission direction of a transmission resource and a preset grant-free transmission resource, a grant-free transmission resource used for uplink transmission, where the transmission resource includes the grant-free transmission resource.

S1202. Receive uplink information on the grant-free transmission resource used for uplink transmission.

The method 1200 is performed by, for example, a network device. According to the method provided in this embodiment, the grant-free transmission resource used for uplink transmission may be a subset of the preset grant-free transmission resource or may be a resource determined based on a location of the preset grant-free transmission resource. In either case, the grant-free transmission resource used for uplink transmission belongs to the transmission resource whose transmission direction is uplink transmission direction. A network device may determine, based on the transmission direction of the transmission resource and the preset grant-free transmission resource, the grant-free transmission resource used for uplink transmission, thereby avoiding a grant-free transmission failure caused when a transmission direction of a preset grant-free transmission resource is inconsistent with a transmission direction of a transmission resource.

A person skilled in the art may clearly understand that, the network device in the method 1200 may be equivalent to the network device in the method 200, and the transmission resource, the preset grant-free transmission resource, and the grant-free transmission resource used for uplink transmission in the method 1200 each may be equivalent to the transmission resource, the preset grant-free transmission resource, and the grant-free transmission resource used for uplink transmission in the method 200. In addition, a method for receiving uplink information by the network device corresponds to the method for sending uplink information by the terminal device in the method 200. For brevity, details are not described herein again.

Optionally, before the receiving uplink information on the grant-free transmission resource used for uplink transmission, the method 1200 further includes the following step:

S1203. Send first configuration information, where the first configuration information is used to configure the preset grant-free transmission resource.

The preset grant-free transmission resource may be a transmission resource whose transmission direction is an uplink direction by default (for example, according to a communications protocol), and the network device does not need to send the first configuration information to a terminal device. Alternatively, the network device may preconfigure the preset grant-free transmission resource by sending the first configuration information, and the first configuration information includes configuration information related to the preset grant-free transmission resource, for example, parameters such as a time-frequency resource, a reference signal, and transmit power, thereby improving flexibility of grant-free transmission.

Optionally, before the receiving uplink information on the grant-free transmission resource used for uplink transmission, the method 1200 further includes the following step:

S1204. Send first information, where the first information is used to indicate the transmission direction of the transmission resource.

The first information includes at least one piece of the following information: first indication information, where the first indication information is used to indicate the transmission direction of the transmission resource; and second indication information, where the second indication information is used to indicate the transmission direction of the transmission resource; and the first indication information and the second indication information are carried in different signaling.

The first information may be carried in different signaling, thereby improving flexibility and reliability of indicating the transmission direction of the transmission resource.

Optionally, the second indication information is carried in physical layer signaling, and the method 1200 further includes the following step:

51205. Send second configuration information, where the second configuration information is used to configure a first control resource set, and the first control resource set is used to transmit the second indication information.

The network device may configure the first control resource set for the terminal device by using the second configuration information, and send the second indication information on the first control resource set; and the terminal device monitors the second indication information on the first control resource set, so that the terminal device is spared from monitoring the second indication information all the time, thereby reducing power consumption of the terminal device.

Optionally, the first information further includes third indication information, the third indication information is used to indicate a transmission direction of a flexible and variable resource in the transmission resource, and the method 1200 further includes the following step:

S1206. Send third configuration information, where the third configuration information is used to configure a second control resource set, and the second control resource set is used to transmit the third indication information.

The network device may configure the second control resource set for the terminal device by using the third configuration information, and send the third indication information on the second control resource set; and the terminal device monitors the third indication information on the second control resource set, so that the terminal device is spared from monitoring the third indication information all the time, thereby reducing power consumption of the terminal device.

Optionally, before the receiving uplink information on the grant-free transmission resource used for uplink transmission, the method 1200 further includes the following step:

S1207: Send fourth indication information, where the fourth indication information is used to indicate an offset of the preset grant-free transmission resource.

When a transmission resource used for downlink transmission conflicts with the preset grant-free transmission resource, the network device may indicate the offset of the preset grant-free transmission resource to the terminal device by using the fourth indication information, so that the terminal device determines, based on the offset and a location of the preset grant-free transmission resource, a location of the grant-free transmission resource used for uplink transmission, thereby avoiding a grant-free transmission failure caused when a transmission direction of a grant-free transmission resource is inconsistent with a transmission direction of a transmission resource.

Optionally, the grant-free transmission resource used for uplink transmission is a transmission resource whose transmission direction is an uplink transmission direction in a time period corresponding to the preset grant-free transmission resource.

The network device needs to determine, based on a transmission direction of a transmission resource in a time period corresponding to a grant-free transmission resource, whether the grant-free transmission resource is available. When a transmission resource in the time period corresponding to the grant-free transmission resource is used for uplink transmission, the grant-free transmission resource is available. When a transmission resource in the time period corresponding to the grant-free transmission resource is used for downlink transmission, the grant-free transmission resource is unavailable. For example, when a first resource in grant-free transmission resources is unavailable, the network device may determine an available second resource from the transmission resources, and use the second resource as the grant-free transmission resource used for uplink transmission. The second resource may be a grant-free transmission resource in preset grant-free transmission resources that is after the first resource, or the second resource may be an available transmission resource in a time period (for example, a slot) corresponding to the first resource. According to the method provided in this embodiment, a grant-free transmission failure caused when a transmission direction of a preset grant-free transmission resource is inconsistent with a transmission direction of a transmission resource can be avoided. When the second resource is an available transmission resource in the time period corresponding to the first resource, the network device may receive uplink information on a resource other than the preset grant-free transmission resource, thereby reducing a latency in receiving the uplink information.

FIG. 13 shows still another uplink information receiving method according to this application. The method 1300 includes the following steps:

S1301. Send first configuration information, where the first configuration information is used to configure a grant-free transmission resource.

S1302. Send second configuration information, where the second configuration information is used to configure a first control resource set.

S1303. Send fourth indication information on the first control resource set, where the fourth indication information is used to indicate an offset.

S1304. Determine, based on the offset and the grant-free transmission resource configured by using the first configuration information, a grant-free transmission resource used for uplink transmission.

S1305. Receive uplink information on the grant-free transmission resource used for uplink transmission.

The method 1300 is performed by, for example, a network device. According to the method provided in this embodiment, the network device may determine an offset of the grant-free transmission resource based on a transmission direction of a transmission resource and an initial location of the grant-free transmission resource, and indicate the offset to a terminal device by using the fourth indication information, so that the terminal device determines, based on the initial location of the grant-free transmission resource and the offset, the grant-free transmission resource used for uplink transmission, thereby avoiding a grant-free transmission failure caused when a transmission direction of a grant-free transmission resource is inconsistent with a transmission direction of a transmission resource.

A person skilled in the art may clearly understand that, the network device in the method 1300 may be equivalent to the network device in the method 600, and the grant-free transmission resource, the first control resource set, and the grant-free transmission resource used for uplink transmission in the method 1300 each may be equivalent to the grant-free transmission resource, the first control resource set, and the grant-free transmission resource used for uplink transmission in the method 600. In addition, a method for receiving uplink information by the network device corresponds to the method for sending uplink information by the terminal device in the method 600. For brevity, details are not described herein again.

Optionally, the offset is used to determine a start location at which the grant-free transmission resource configured by using the first configuration information is activated or deactivated, or the offset is used to determine a location of the grant-free transmission resource after the fourth indication information is received.

A location indicated by the offset may be the start location at which the grant-free transmission resource is activated or deactivated, or may be a specific location of the grant-free transmission resource, so that the grant-free transmission resource used for sending uplink information can be flexibly indicated.

FIG. 14 shows a downlink control channel detection method according to this application. The method 1400 includes the following steps:

S1401. Determine, based on a transmission direction of a transmission resource and a preset downlink control resource set, a downlink control resource set used for detecting downlink control channels, where the preset transmission resource includes the downlink control resource set.

S1402. Detect a downlink control channel on the downlink control resource set used for detecting downlink control channels.

The method 1400 is performed by, for example, a terminal device. According to the method provided in this embodiment, the downlink control resource set used for detecting downlink control channels is a subset of the preset downlink control resource set, or the downlink control resource set used for detecting downlink control channels is a resource set determined by the terminal device based on a location of the preset downlink control resource set. In either case, the downlink control resource set used for detecting downlink control channels belongs to the transmission resource whose transmission direction is downlink transmission direction. The terminal device may determine, based on the transmission direction of the transmission resource and the preset downlink control resource set, the downlink control resource set used for detecting downlink control channels, so that the terminal device can be spared from detecting a downlink control channel on each configured downlink control resource set, thereby reducing power consumption of the terminal device.

Optionally, before the determining, based on a transmission direction of a transmission resource and a preset downlink control resource set, a downlink control resource set used for detecting downlink control channels, the method 1400 further includes the following step:

S1403. Receive fourth configuration information, where the fourth configuration information is used to configure the preset downlink control resource set.

The preset downlink control resource set may be preconfigured by the terminal device based on the fourth configuration information sent by a network device, and the fourth configuration information includes configuration information related to the preset downlink control resource set, for example, a parameter such as a time-frequency resource, thereby improving flexibility of detecting a downlink control channel.

Optionally, the preset downlink control resource set may be a transmission resource whose transmission direction is a downlink direction by default (for example, according to a communications protocol), and may be determined by the terminal device without receiving the configuration information sent by the network device.

Optionally, before the determining, based on a transmission direction of a transmission resource and a preset downlink control resource set, a downlink control resource set used for detecting downlink control channels, the method 1400 further includes the following step:

S1404. Receive second information, where the second information is used to indicate the transmission direction of the transmission resource.

The second information includes at least one piece of the following information:

fifth indication information, where the fifth indication information is used to indicate the transmission direction of the transmission resource; and sixth indication information, where the sixth indication information is used to indicate the transmission direction of the transmission resource; and the fifth indication information and the sixth indication information are carried in different signaling.

The second information may be carried in different signaling, thereby improving flexibility and reliability of indicating the transmission direction of the transmission resource.

Optionally, the sixth indication information is carried in physical layer signaling, and the method 1400 further includes the following steps:

S1405. Receive fifth configuration information, where the fifth configuration information is used to configure a third control resource set.

S1406. Monitor the sixth indication information on the third control resource set.

The terminal device may determine the third control resource set based on the fifth configuration information sent by the network device, where the third control resource set is used to transmit the sixth indication information; and the terminal device monitors the sixth indication information on the third control resource set, so that the terminal device is spared from monitoring the sixth indication information all the time, thereby reducing power consumption of the terminal device.

Optionally, the second information further includes seventh indication information, the seventh indication information is used to indicate a transmission direction of a flexible and variable resource in the transmission resource, and the method 1400 further includes the following steps:

S1407. Receive sixth configuration information, where the sixth configuration information is used to configure a fourth control resource set.

S1408. Monitor the seventh indication information on the fourth control resource set.

The terminal device may determine the fourth control resource set based on the sixth configuration information sent by the network device, where the fourth control resource set is used to transmit the seventh indication information; and the terminal device monitors the seventh indication information on the fourth control resource set, so that the terminal device is spared from monitoring the seventh indication information all the time, thereby reducing power consumption of the terminal device.

Optionally, the downlink control resource set used for detecting downlink control channels is a transmission resource whose transmission direction is a downlink transmission direction in a time period corresponding to the preset downlink control resource set.

A configured downlink control resource set may overlap with a transmission resource used for uplink transmission, and consequently, cannot be used to transmit a downlink control channel. Therefore, the terminal device and the network device may separately determine, from a time period corresponding to the configured downlink control resource set, a downlink control resource set used for detecting downlink control channels, and detect a downlink control channel on the downlink control resource set used for detecting downlink control channels. According to the method provided in this embodiment, the terminal device may skip a downlink control resource set whose transmission direction is an uplink direction, and detect a downlink control channel only on a downlink control resource set whose transmission direction is a downlink direction, thereby reducing power consumption of the terminal device.

FIG. 15 shows a downlink control channel sending method according to this application. The method 1500 includes the following steps:

S1501. Determine, based on a transmission direction of a transmission resource and a preset downlink control resource set, a downlink control resource set used for sending downlink control channels, where the preset transmission resource includes the downlink control resource set.

S1502. Send a downlink control channel on the downlink control resource set used for sending downlink control channels.

The method 1500 is performed by, for example, a network device. According to the method provided in this embodiment, the downlink control resource set used for sending downlink control channels is a subset of the preset downlink control resource set, or the downlink control resource set used for sending downlink control channels is a resource set determined by the network device based on a location of the preset downlink control resource set. In either case, the downlink control resource set used for sending downlink control channels belongs to the transmission resource whose transmission direction is downlink transmission direction. The network device may determine, based on the transmission direction of the transmission resource and the preset downlink control resource set, the downlink control resource set used for sending downlink control channels. A terminal device may also determine, based on the transmission direction of the transmission resource and the preset downlink control resource set, the downlink control resource set used for sending downlink control channels by the network device, so that the terminal device can be spared from detecting a downlink control channel on each configured downlink control resource set, thereby reducing power consumption of the terminal device.

Optionally, before the sending a downlink control channel on the downlink control resource set used for sending downlink control channels, the method 1500 further includes the following step:

S1503. Send fourth configuration information, where the fourth configuration information is used to configure the preset downlink control resource set.

The preset downlink control resource set may be a transmission resource whose transmission direction is a downlink direction by default (for example, according to a communications protocol), and the network device does not need to send the fourth configuration information to the terminal device. Alternatively, the preset downlink control resource set may be preconfigured based on the fourth configuration information sent by the network device, and the fourth configuration information includes configuration information related to the preset downlink control resource set, for example, a parameter such as a time-frequency resource, thereby improving flexibility of detecting a downlink control channel by the terminal device.

Optionally, before the sending a downlink control channel on the downlink control resource set used for sending downlink control channels, the method 1500 further includes the following step:

S1504. Send second information, where the second information is used to indicate the transmission direction of the transmission resource.

The second information includes at least one piece of the following information:

fifth indication information, where the fifth indication information is used to indicate the transmission direction of the transmission resource; and sixth indication information, where the sixth indication information is used to indicate the transmission direction of the transmission resource; and the fifth indication information and the sixth indication information are carried in different signaling.

The second information may be carried in different signaling, thereby improving flexibility and reliability of indicating the transmission direction of the transmission resource.

Optionally, the sixth indication information is carried in physical layer signaling, and the method 1500 further includes the following step:

S1505. Send fifth configuration information, where the fifth configuration information is used to configure a third control resource set.

The network device configures the third control resource set for the terminal device by using the fifth configuration information, and the terminal device monitors the sixth indication information on the third control resource set, so that the terminal device is spared from monitoring the sixth indication information all the time, thereby reducing power consumption of the terminal device.

Optionally, the second information further includes seventh indication information, the seventh indication information is used to indicate a transmission direction of a flexible and variable resource in the transmission resource, and the method 1500 further includes the following step:

S1506. Send sixth configuration information, where the sixth configuration information is used to configure a fourth control resource set.

The network device may configure the fourth control resource set for the terminal device by using the sixth configuration information, and the terminal device monitors the seventh indication information on the fourth control resource set, so that the terminal device is spared from monitoring the seventh indication information all the time, thereby reducing power consumption of the terminal device.

Optionally, the downlink control resource set used for sending downlink control channels is a transmission resource whose transmission direction is a downlink transmission direction in a time period corresponding to the preset downlink control resource set.

A configured downlink control resource set may overlap with a transmission resource used for uplink transmission, and consequently, cannot be used to transmit a downlink control channel. Therefore, the terminal device and the network device may separately determine, from a time period corresponding to the configured downlink control resource set, a downlink control resource set used for detecting downlink control channels, and detect a downlink control channel on the downlink control resource set used for detecting downlink control channels. According to the method provided in this embodiment, the terminal device may skip a downlink control resource set whose transmission direction is an uplink direction, and detect a downlink control channel only on a downlink control resource set whose transmission direction is a downlink direction, thereby reducing power consumption of the terminal device.

FIG. 16 shows another downlink control channel sending method according to this application. The method 1500 includes the following steps:

S1601. Send second information, where the second information is used to indicate a transmission direction of a transmission resource, and the transmission direction includes a downlink transmission direction.

S1602. Send fourth configuration information, where the fourth configuration information is used to configure a downlink control resource set, and the downlink control resource set is a subset of a transmission resource whose transmission direction is the downlink transmission direction.

S1603. Send a downlink control channel on the downlink control resource set.

The method 1600 is performed by, for example, a network device. According to the method provided in this embodiment, the control resource set configured by the network device by using the fourth configuration information is a subset of the transmission resource whose transmission direction is the downlink direction, and the network device does not need to indicate whether the control resource set is available, thereby reducing signaling overheads.

Optionally, before the sending fourth configuration information, the method 1600 further includes the following step:

S1604. Determine the downlink control resource set based on the transmission direction of the transmission resource.

The network device may first determine the transmission direction of the transmission resource, and then determine the downlink control resource set, so that the downlink control resource set configured by using the fourth configuration information is a subset of the transmission resource whose transmission direction is the downlink direction.

Optionally, before the sending second information, the method 1600 further includes the following step:

S1605. Determine the transmission direction of the transmission resource based on the downlink control resource set.

Alternatively, the network device may first determine the downlink control resource set, and then determine the transmission direction of the transmission resource, so that the downlink control resource set configured by using the fourth configuration information is a subset of the transmission resource whose transmission direction is the downlink direction.

The foregoing describes in detail examples of the methods provided in this application, such as the uplink information sending method and the uplink information receiving method. It may be understood that to implement the foregoing functions, the terminal device and the network device each include a corresponding hardware structure and/or software module for performing the functions. A person skilled in the art should easily be aware that, in combination with the example units and algorithm steps described in the embodiments disclosed in this specification, this application can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, functional unit division may be performed on the terminal device and the network device based on the foregoing method examples. For example, each functional unit may be obtained through division based on each corresponding function, or two or more functions may be integrated into one processing unit. The integrated unit may be implemented in a form of hardware, or may be implemented in a form of a software functional unit. It should be noted that, in this application, unit division is an example, and is merely logical function division. In actual implementation, there may be another division manner.

Figure 17:
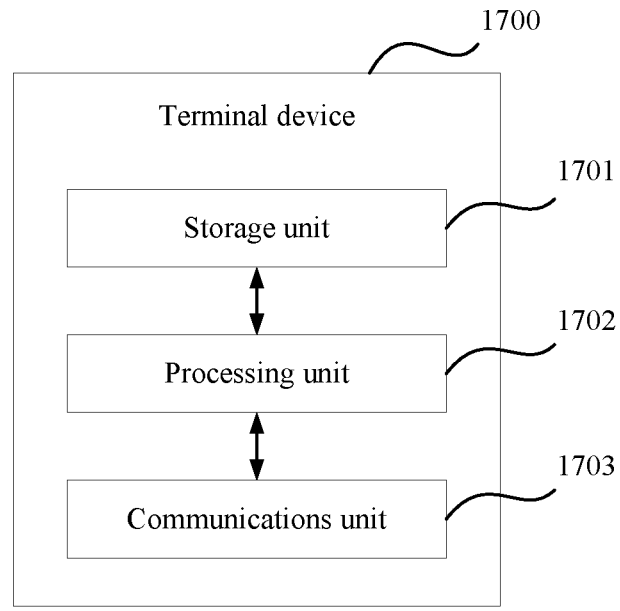
FIG. 17 is a schematic diagram of a possible terminal device according to an embodiment of this application.

When an integrated unit is used, FIG. 17 is a possible schematic structural diagram of the terminal device in the foregoing embodiments. A terminal device 1700 includes a processing unit 1702 and a communications unit 1703. The processing unit 1702 is configured to control and manage actions of the terminal device 1700. For example, the processing unit 1702 is configured to support the terminal device 1700 in performing each step in FIG. 2 and/or another process of the technologies described in this specification. The communications unit 1703 is configured to support the terminal device 1700 in communicating with another communications device, for example, communicating with a network device. The terminal device 1700 may further include a storage unit 1701, configured to store program code and data of the terminal device 1700.

For example, the processing unit 1702 is configured to determine, based on a transmission direction of a transmission resource and a preset grant-free transmission resource, a grant-free transmission resource used for uplink transmission, where the transmission resource includes the grant-free transmission resource.

The processing unit 1702 controls the communications unit 1703 to send uplink information on the grant-free transmission resource used for uplink transmission.

The processing unit 1702 may be a processor or a controller, such as a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processing unit 1702 may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications unit 1703 may be a transceiver, a transceiver circuit, or the like. The storage unit 1701 may be a memory.

Figure 18:
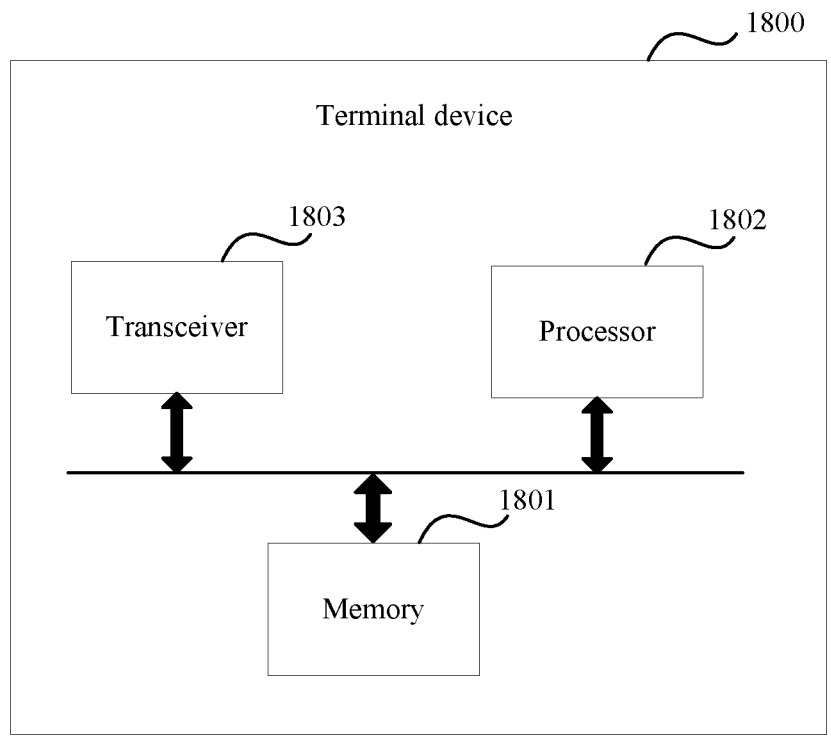
FIG. 18 is a schematic diagram of another possible terminal device according to an embodiment of this application.

When the processing unit 1702 is a processor, the communications unit 1703 is a transceiver, and the storage unit 1701 is a memory, the terminal device in this application may be a terminal device 1800 shown in FIG. 18.

As shown in FIG. 18, the terminal device 1800 includes a processor 1802, a transceiver 1803, and a memory 1801. The transceiver 1803, the processor 1802, and the memory 1801 may communicate with each other through an internal connection channel, to transmit a control signal and/or a data signal.

It may be clearly understood by a person skilled in the art that, for ease and brief description, for a detailed working process of the foregoing apparatus and units, refer to a corresponding process in the foregoing method embodiments. Details are not described herein again.

The terminal device 1700 and the terminal device 1800 provided in this application may determine, based on the transmission direction of the transmission resource and the preset grant-free transmission resource, the grant-free transmission resource used for uplink transmission, thereby avoiding a grant-free transmission failure caused when a transmission direction of a preset grant-free transmission resource is inconsistent with a transmission direction of a transmission resource.

Figure 19:
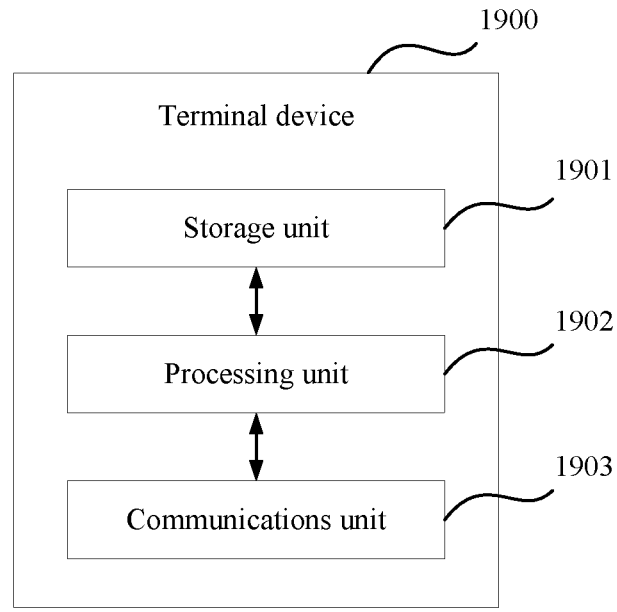
FIG. 19 is a schematic diagram of still another possible terminal device according to an embodiment of this application.

When an integrated unit is used, FIG. 19 is a possible schematic structural diagram of the terminal device in the foregoing embodiments. A terminal device 1900 includes a processing unit 1902 and a communications unit 1903. The processing unit 1902 is configured to control and manage actions of the terminal device 1900. For example, the processing unit 1902 is configured to support the terminal device 1900 in performing each step in FIG. 6 and/or another process of the technologies described in this specification. The communications unit 1903 is configured to support the terminal device 1900 in communicating with another communications device, for example, communicating with a network device. The terminal device 1900 may further include a storage unit 1901, configured to store program code and data of the terminal device 1900.

For example, the processing unit 1902 controls the communications unit 1903 to:

receive first configuration information, where the first configuration information is used to configure a grant-free transmission resource;

receive second configuration information, where the second configuration information is used to configure a first control resource set; and monitor fourth indication information on the first control resource set, where the fourth indication information is used to indicate an offset of the grant-free transmission resource configured by using the first configuration information.

The processing unit 1902 is configured to determine, based on the offset indicated by the monitored fourth indication information and the grant-free transmission resource configured by using the first configuration information, a grant-free transmission resource used for uplink transmission.

The processing unit 1902 controls the communications unit 1903 to send uplink information on the grant-free transmission resource used for uplink transmission.

The processing unit 1902 may be a processor or a controller, such as a CPU, a general purpose processor, a DSP, an ASIC, an FPGA or another programmable logic device, a transistor logic device, a hardware component, or any combination thereof. The processing unit 1902 may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications unit 1903 may be a transceiver, a transceiver circuit, or the like. The storage unit 1901 may be a memory.

Figure 20:
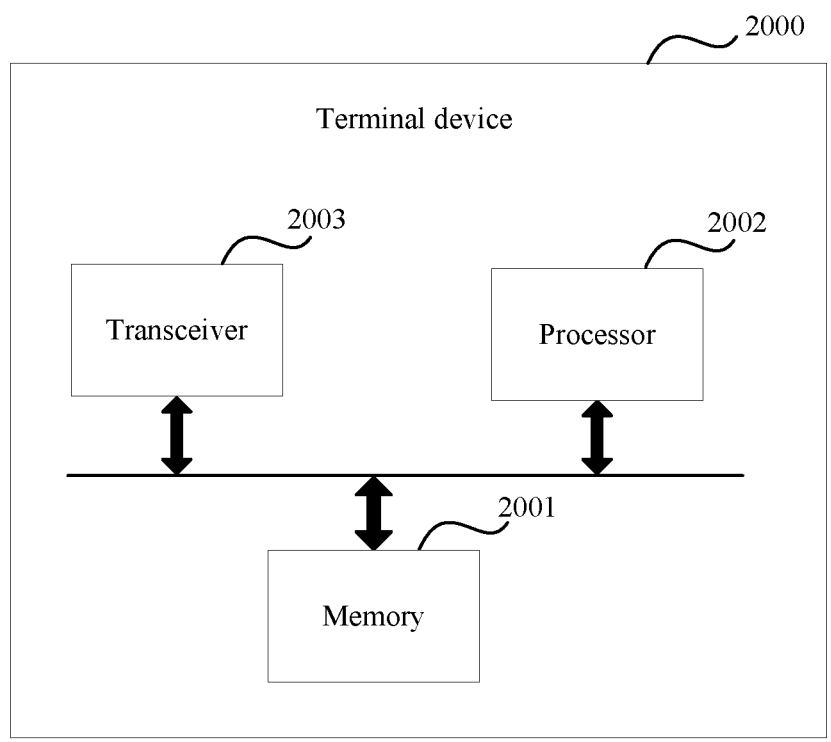
FIG. 20 is a schematic diagram of still another possible terminal device according to an embodiment of this application.

When the processing unit 1902 is a processor, the communications unit 1903 is a transceiver, and the storage unit 1901 is a memory, the terminal device in this application may be a terminal device 2000 shown in FIG. 20.

As shown in FIG. 20, the terminal device 2000 includes a processor 2002, a transceiver 2003, and a memory 2001. The transceiver 2003, the processor 2002, and the memory 2001 may communicate with each other through an internal connection channel, to transmit a control signal and/or a data signal.

It may be clearly understood by a person skilled in the art that, for ease and brief description, for a detailed working process of the foregoing apparatus and units, refer to a corresponding process in the foregoing method embodiments. Details are not described herein again.

The terminal device 1900 and the terminal device 2000 provided in this application may determine the offset of the grant-free transmission resource based on the fourth indication information, and determine, based on an initial location of the grant-free transmission resource and the offset, the grant-free transmission resource used for uplink transmission, thereby avoiding a grant-free transmission failure caused when a transmission direction of a grant-free transmission resource is inconsistent with a transmission direction of a transmission resource.

Figure 21:
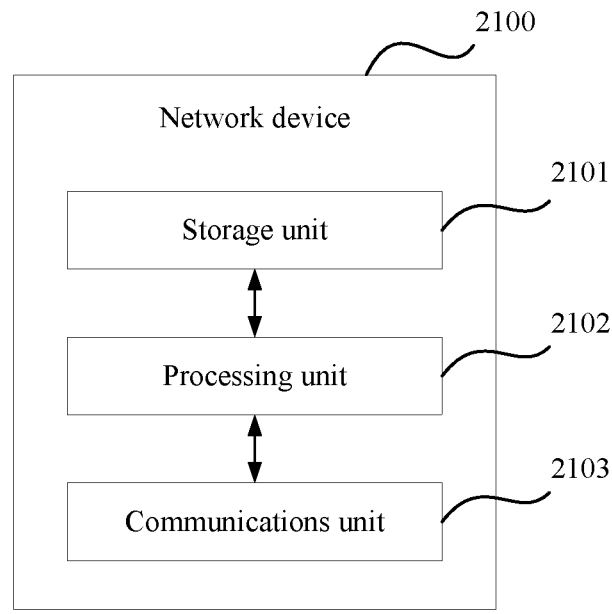
FIG. 21 is a schematic diagram of a possible network device according to an embodiment of this application.

When an integrated unit is used, FIG. 21 is a possible schematic structural diagram of the network device in the foregoing embodiments. A network device 2100 includes a processing unit 2102 and a communications unit 2103. The processing unit 2102 is configured to control and manage actions of the network device 2100. For example, the processing unit 2102 is configured to support the network device 2100 in performing each step in FIG. 12 and/or another process of the technologies described in this specification. The communications unit 2103 is configured to support the network device 2100 in communicating with another communications device, for example, communicating with a terminal device. The network device 2100 may further include a storage unit 2101, configured to store program code and data of the network device 2100.

For example, the processing unit 2102 is configured to determine, based on a transmission direction of a transmission resource and a preset grant-free transmission resource, a grant-free transmission resource used for uplink transmission, where the transmission resource includes the grant-free transmission resource.

The processing unit 2102 controls the communications unit 2103 to receive uplink information on the grant-free transmission resource used for uplink transmission.

The processing unit 2102 may be a processor or a controller, such as a CPU, a general purpose processor, a DSP, an ASIC, an FPGA or another programmable logic device, a transistor logic device, a hardware component, or any combination thereof. The processing unit 2102 may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications unit 2103 may be a transceiver, a transceiver circuit, or the like. The storage unit 2101 may be a memory.

Figure 22:
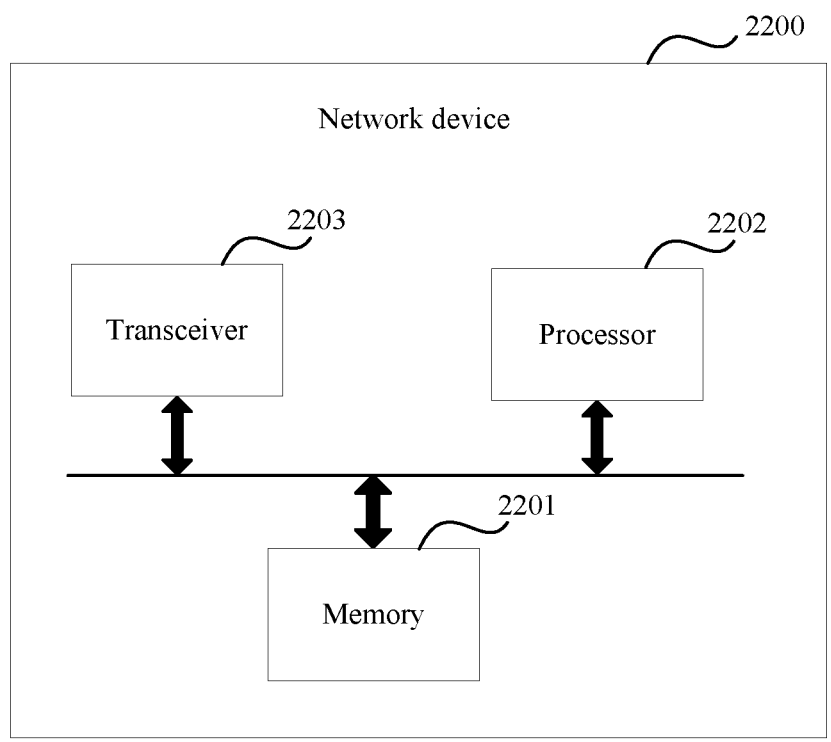
FIG. 22 is a schematic diagram of another possible network device according to an embodiment of this application.

When the processing unit 2102 is a processor, the communications unit 2103 is a transceiver, and the storage unit 2101 is a memory, the network device in this application may be a network device 2200 shown in FIG. 22.

As shown in FIG. 22, the network device 2200 includes a processor 2202, a transceiver 2203, and a memory 2201. The transceiver 2203, the processor 2202, and the memory 2201 may communicate with each other through an internal connection channel, to transmit a control signal and/or a data signal.

It may be clearly understood by a person skilled in the art that, for ease and brief description, for a detailed working process of the foregoing apparatus and units, refer to a corresponding process in the foregoing method embodiments. Details are not described herein again.

The network device 2100 and the network device 2200 provided in this application may determine, based on the transmission direction of the transmission resource and the preset grant-free transmission resource, the grant-free transmission resource used for uplink transmission, thereby avoiding a grant-free transmission failure caused when a transmission direction of a preset grant-free transmission resource is inconsistent with a transmission direction of a transmission resource.

Figure 23:
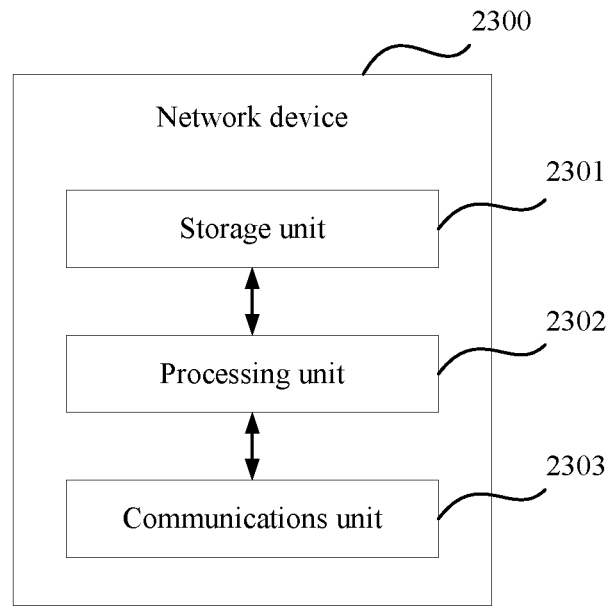
FIG. 23 is a schematic diagram of still another possible network device according to an embodiment of this application.

When an integrated unit is used, FIG. 23 is a possible schematic structural diagram of the network device in the foregoing embodiments. A network device 2300 includes a processing unit 2302 and a communications unit 2303. The processing unit 2302 is configured to control and manage actions of the network device 2300. For example, the processing unit 2302 is configured to support the network device 2300 in performing each step in FIG. 13 and/or another process of the technologies described in this specification. The communications unit 2303 is configured to support the network device 2300 in communicating with another communications device, for example, communicating with a terminal device. The network device 2300 may further include a storage unit 2301, configured to store program code and data of the network device 2300.

For example, the processing unit 2302 controls the communications unit 2303 to:

send first configuration information, where the first configuration information is used to configure a grant-free transmission resource;

send second configuration information, where the second configuration information is used to configure a first control resource set; and send fourth indication information on the first control resource set, where the fourth indication information is used to indicate an offset.

The processing unit 2302 is configured to determine, based on the offset and the grant-free transmission resource configured by using the first configuration information, a grant-free transmission resource used for uplink transmission.

The processing unit 2302 controls the communications unit 2303 to receive uplink information on the grant-free transmission resource used for uplink transmission.

The processing unit 2302 may be a processor or a controller, such as a CPU, a general purpose processor, a DSP, an ASIC, an FPGA or another programmable logic device, a transistor logic device, a hardware component, or any combination thereof. The processing unit 2302 may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications unit 2303 may be a transceiver, a transceiver circuit, or the like. The storage unit 2301 may be a memory.

Figure 24:
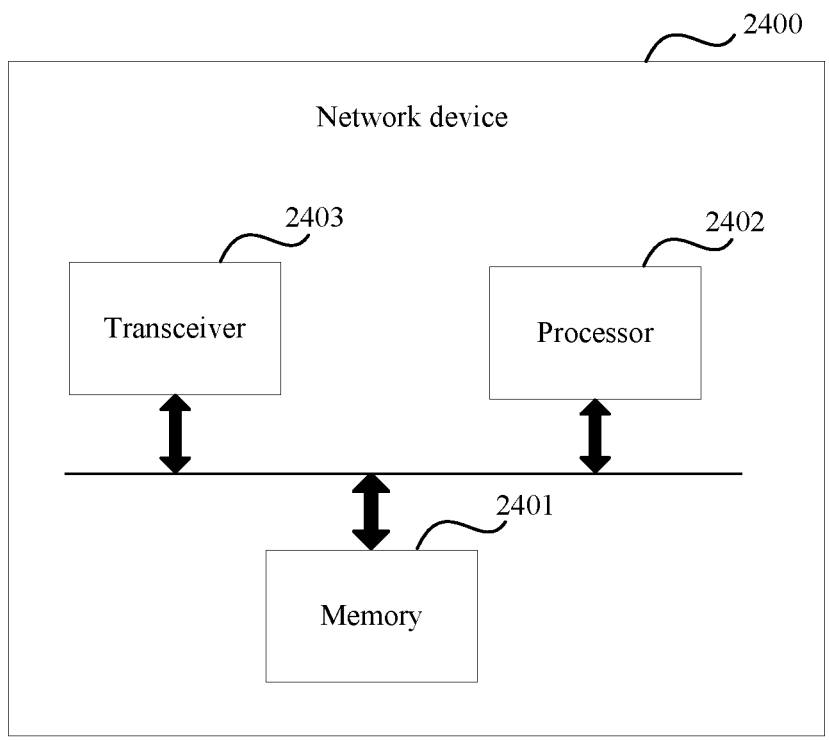
FIG. 24 is a schematic diagram of still another possible network device according to an embodiment of this application.

When the processing unit 2302 is a processor, the communications unit 2303 is a transceiver, and the storage unit 2301 is a memory, the network device in this application may be a network device 2400 shown in FIG. 24.

As shown in FIG. 24, the network device 2400 includes a processor 2402, a transceiver 2403, and a memory 2401. The transceiver 2403, the processor 2402, and the memory 2401 may communicate with each other through an internal connection channel, to transmit a control signal and/or a data signal.

It may be clearly understood by a person skilled in the art that, for ease and brief description, for a detailed working process of the foregoing apparatus and units, refer to a corresponding process in the foregoing method embodiments. Details are not described herein again.

The network device 2300 and the network device 2400 provided in this application may determine an offset of the grant-free transmission resource based on a transmission direction of a transmission resource and an initial location of the grant-free transmission resource, where the offset is indicated to the terminal device by using the fourth indication information, so that the terminal device determines, based on the initial location of the grant-free transmission resource and the offset, the grant-free transmission resource used for uplink transmission, thereby avoiding a grant-free transmission failure caused when a transmission direction of a grant-free transmission resource is inconsistent with a transmission direction of a transmission resource.

Figure 25:
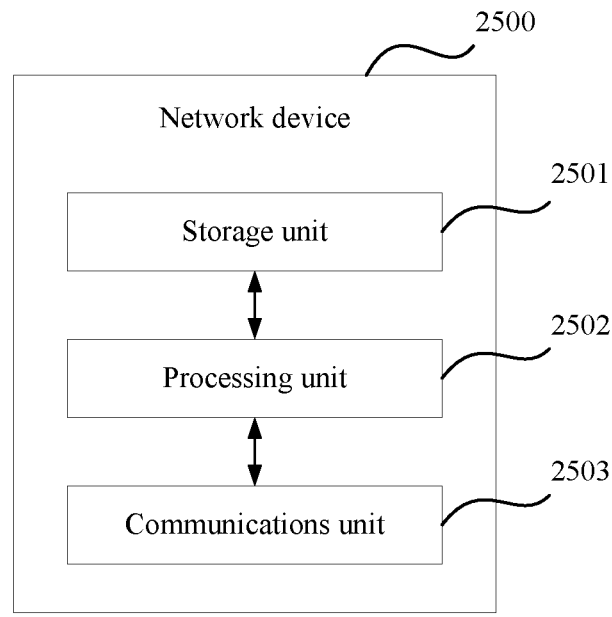
FIG. 25 is a schematic diagram of still another possible network device according to an embodiment of this application.

When an integrated unit is used, FIG. 25 is a possible schematic structural diagram of the network device in the foregoing embodiments. A network device 2500 includes a processing unit 2502 and a communications unit 2503. The processing unit 2502 is configured to control and manage actions of the network device 2500. For example, the processing unit 2502 is configured to support the network device 2500 in performing each step in FIG. 8 and/or another process of the technologies described in this specification. The communications unit 2503 is configured to support the network device 2500 in communicating with another communications device, for example, communicating with a terminal device. The network device 2500 may further include a storage unit 2501, configured to store program code and data of the network device 2500.

For example, the processing unit 2502 controls the communications unit 2503 to:

send first information, where the first information is used to indicate a transmission direction of a transmission resource, and the transmission direction includes an uplink transmission direction;

send first configuration information, where the first configuration information is used to configure a grant-free transmission resource, and the grant-free transmission resource is a subset of a transmission resource whose transmission direction is the uplink transmission direction; and receive uplink information on the grant-free transmission resource.

The processing unit 2502 may be a processor or a controller, such as a CPU, a general purpose processor, a DSP, an ASIC, an FPGA or another programmable logic device, a transistor logic device, a hardware component, or any combination thereof. The processing unit 2502 may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications unit 2503 may be a transceiver, a transceiver circuit, or the like. The storage unit 2501 may be a memory.

Figure 26:
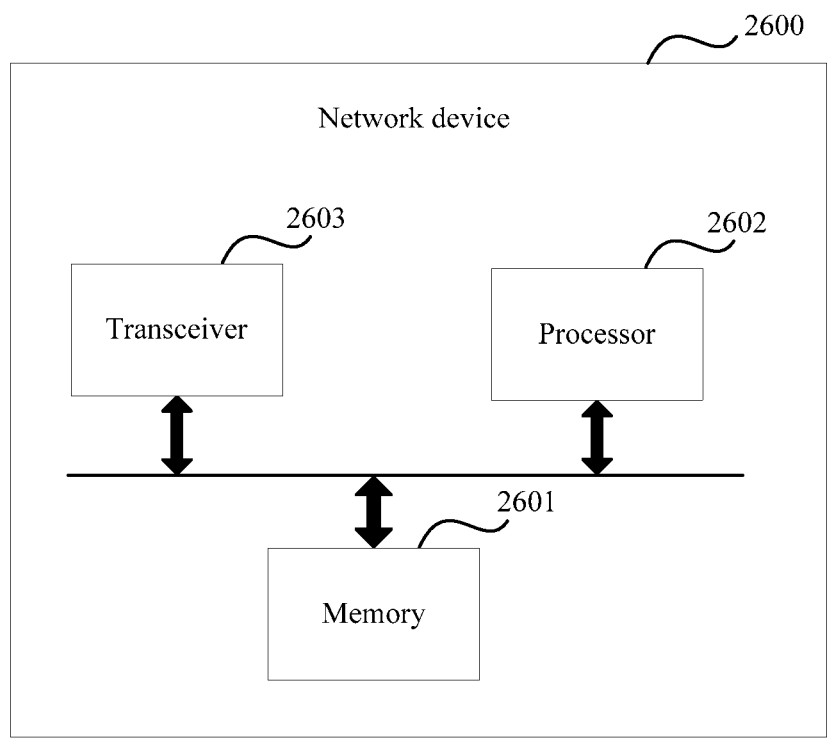
FIG. 26 is a schematic diagram of still another possible network device according to an embodiment of this application.

When the processing unit 2502 is a processor, the communications unit 2503 is a transceiver, and the storage unit 2501 is a memory, the network device in this application may be a network device 2600 shown in FIG. 26.

As shown in FIG. 26, the network device 2600 includes a processor 2602, a transceiver 2603, and a memory 2601. The transceiver 2603, the processor 2602, and the memory 2601 may communicate with each other through an internal connection channel, to transmit a control signal and/or a data signal.

It may be clearly understood by a person skilled in the art that, for ease and brief description, for a detailed working process of the foregoing apparatus and units, refer to a corresponding process in the foregoing method embodiments. Details are not described herein again.

According to the network device 2500 and the network device 2600 provided in this application, the grant-free transmission resource configured by using the first configuration information is a subset of the transmission resource whose transmission direction is the uplink transmission direction; and the network device does not need to indicate an offset of the grant-free transmission resource, and does not need to indicate whether the grant-free transmission resource is available, thereby reducing signaling overheads.

Figure 27:
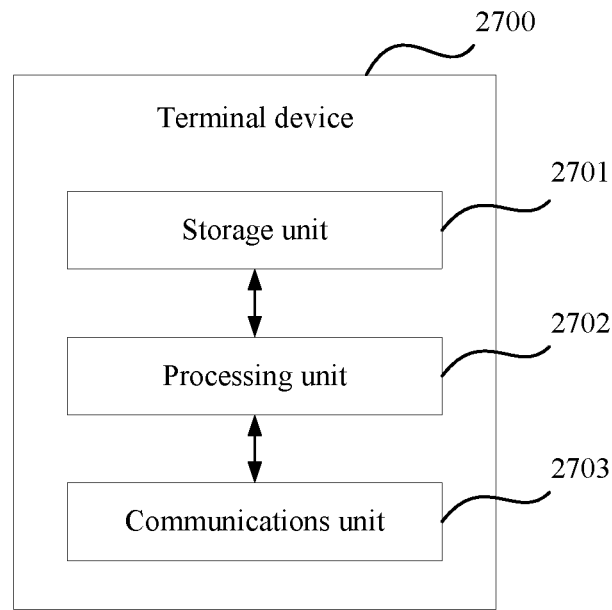
FIG. 27 is a schematic diagram of still another possible terminal device according to an embodiment of this application.

When an integrated unit is used, FIG. 27 is a possible schematic structural diagram of the terminal device in the foregoing embodiments. A terminal device 2700 includes a processing unit 2702 and a communications unit 2703. The processing unit 2702 is configured to control and manage actions of the terminal device 2700. For example, the processing unit 2702 is configured to support the terminal device 2700 in performing each step in FIG. 14 and/or another process of the technologies described in this specification. The communications unit 2703 is configured to support the terminal device 2700 in communicating with another communications device, for example, communicating with a network device. The terminal device 2700 may further include a storage unit 2701, configured to store program code and data of the terminal device 2700.

For example, the processing unit 2702 is configured to determine, based on a transmission direction of a transmission resource and a preset downlink control resource set, a downlink control resource set used for detecting downlink control channels, where the preset transmission resource includes the downlink control resource set.

The processing unit 2702 controls the communications unit 2703 to detect a downlink control channel on the downlink control resource set used for detecting downlink control channels.

The processing unit 2702 may be a processor or a controller, such as a CPU, a general purpose processor, a DSP, an ASIC, an FPGA or another programmable logic device, a transistor logic device, a hardware component, or any combination thereof. The processing unit 2702 may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications unit 2703 may be a transceiver, a transceiver circuit, or the like. The storage unit 2701 may be a memory.

Figure 28:
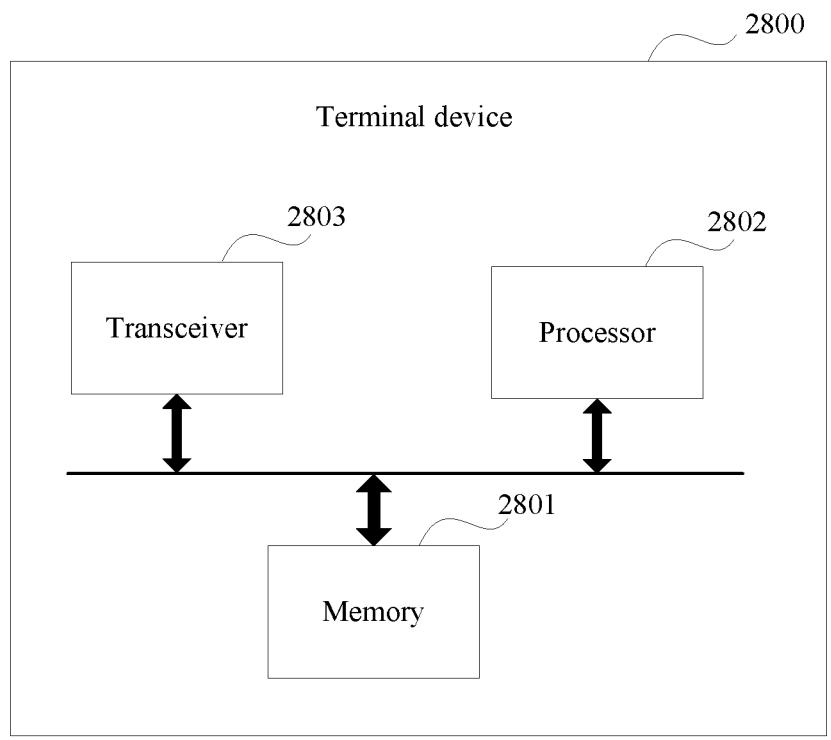
FIG. 28 is a schematic diagram of still another possible terminal device according to an embodiment of this application.

When the processing unit 2702 is a processor, the communications unit 2703 is a transceiver, and the storage unit 2701 is a memory, the terminal device in this application may be a terminal device 2800 shown in FIG. 28.

As shown in FIG. 28, the terminal device 2800 includes a processor 2802, a transceiver 2803, and a memory 2801. The transceiver 2803, the processor 2802, and the memory 2801 may communicate with each other through an internal connection channel, to transmit a control signal and/or a data signal.

It may be clearly understood by a person skilled in the art that, for ease and brief description, for a detailed working process of the foregoing apparatus and units, refer to a corresponding process in the foregoing method embodiments. Details are not described herein again.

The terminal device 2700 and the terminal device 2800 provided in this application may determine, based on the transmission direction of the transmission resource and the preset downlink control resource set, the downlink control resource set used for detecting downlink control channels, so that the terminal device can be spared from detecting a downlink control channel on each configured downlink control resource set, thereby reducing power consumption of the terminal device.

Figure 29:
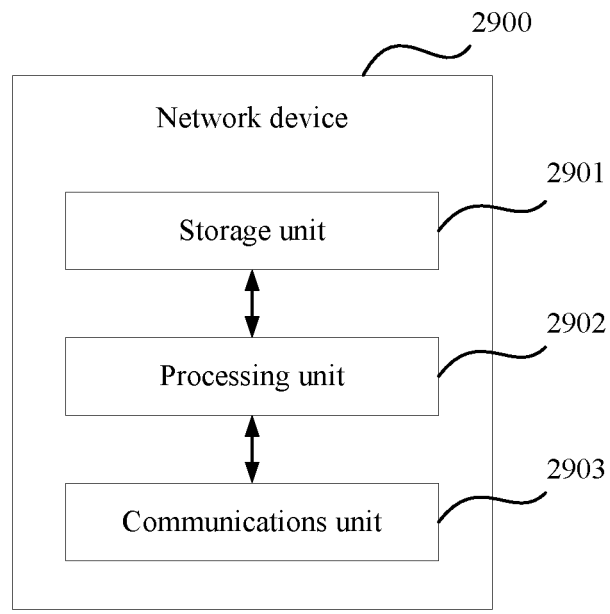
FIG. 29 is a schematic diagram of still another possible network device according to an embodiment of this application.

When an integrated unit is used, FIG. 29 is a possible schematic structural diagram of the network device in the foregoing embodiments. A network device 2900 includes a processing unit 2902 and a communications unit 2903. The processing unit 2902 is configured to control and manage actions of the network device 2900. For example, the processing unit 2902 is configured to support the network device 2900 in performing each step in FIG. 15 and/or another process of the technologies described in this specification. The communications unit 2903 is configured to support the network device 2900 in communicating with another communications device, for example, communicating with a terminal device. The network device 2900 may further include a storage unit 2901, configured to store program code and data of the network device 2900.

For example, the processing unit 2902 is configured to determine, based on a transmission direction of a transmission resource and a preset downlink control resource set, a downlink control resource set used for sending downlink control channels, where the preset transmission resource includes the downlink control resource set.

The processing unit 2902 controls the communications unit 2903 to send a downlink control channel on the downlink control resource set used for sending downlink control channels.

The processing unit 2902 may be a processor or a controller, such as a CPU, a general purpose processor, a DSP, an ASIC, an FPGA or another programmable logic device, a transistor logic device, a hardware component, or any combination thereof. The processing unit 2902 may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications unit 2903 may be a transceiver, a transceiver circuit, or the like. The storage unit 2901 may be a memory.

Figure 30:
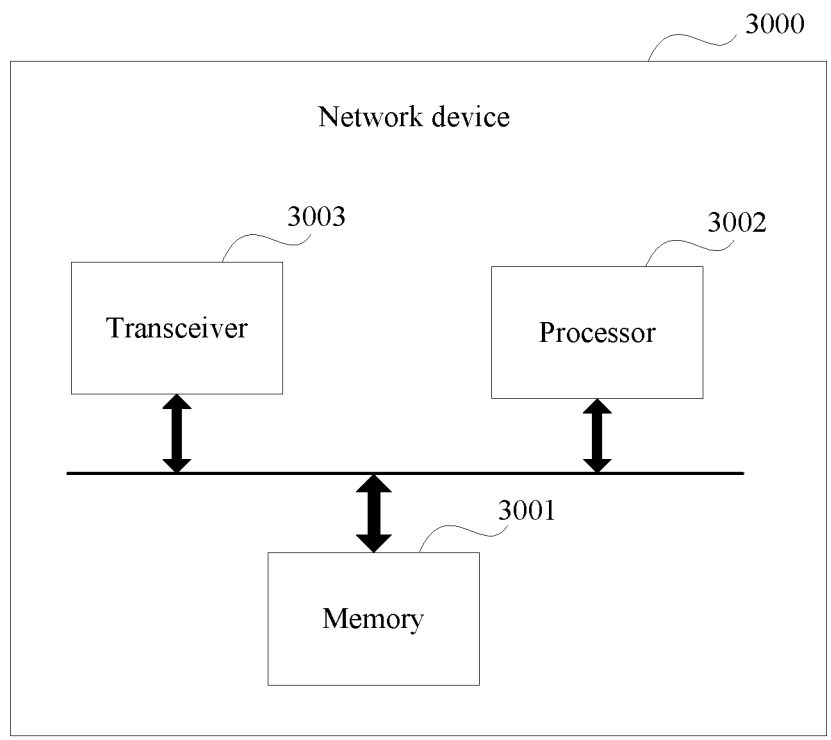
FIG. 30 is a schematic diagram of still another possible network device according to an embodiment of this application.

When the processing unit 2902 is a processor, the communications unit 2903 is a transceiver, and the storage unit 2901 is a memory, the network device in this application may be a network device 3000 shown in FIG. 30.

As shown in FIG. 30, the network device 3000 includes a processor 3002, a transceiver 3003, and a memory 3001. The transceiver 3003, the processor 3002, and the memory 3001 may communicate with each other through an internal connection channel, to transmit a control signal and/or a data signal.

It may be clearly understood by a person skilled in the art that, for ease and brief description, for a detailed working process of the foregoing apparatus and units, refer to a corresponding process in the foregoing method embodiments. Details are not described herein again.

The network device 2900 and the network device 3000 provided in this application may determine, based on the transmission direction of the transmission resource and the preset downlink control resource set, the downlink control resource set used for sending downlink control channels; and the terminal device may also determine, based on the transmission direction of the transmission resource and the preset downlink control resource set, the downlink control resource set used for sending downlink control channels by the network device, so that the terminal device can be spared from detecting a downlink control channel on each configured downlink control resource set, thereby reducing power consumption of the terminal device.

Figure 31:
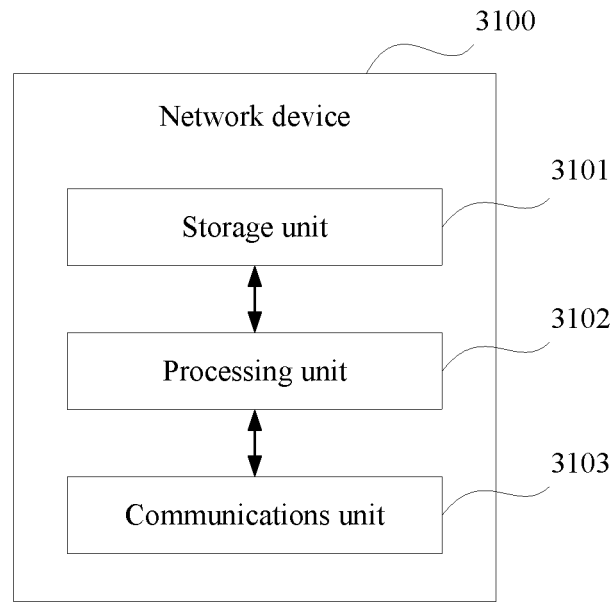
FIG. 31 is a schematic diagram of still another possible network device according to an embodiment of this application.

When an integrated unit is used, FIG. 31 is a possible schematic structural diagram of the network device in the foregoing embodiments. A network device 3100 includes a processing unit 3102 and a communications unit 3103. The processing unit 3102 is configured to control and manage actions of the network device 3100. For example, the processing unit 3102 is configured to support the network device 3100 in performing each step in FIG. 16 and/or another process of the technologies described in this specification. The communications unit 3103 is configured to support the network device 3100 in communicating with another communications device, for example, communicating with a terminal device. The network device 3100 may further include a storage unit 3101, configured to store program code and data of the network device 3100.

For example, the processing unit 3102 controls the communications unit 3103 to:

send second information, where the second information is used to indicate a transmission direction of a transmission resource, and the transmission direction includes a downlink transmission direction;

send fourth configuration information, where the fourth configuration information is used to configure a downlink control resource set, and the downlink control resource set is a subset of a transmission resource whose transmission direction is the downlink transmission direction; and send a downlink control channel on the downlink control resource set.

The processing unit 3102 may be a processor or a controller, such as a CPU, a general purpose processor, a DSP, an ASIC, an FPGA or another programmable logic device, a transistor logic device, a hardware component, or any combination thereof. The processing unit 3102 may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications unit 3103 may be a transceiver, a transceiver circuit, or the like. The storage unit 3101 may be a memory.

Figure 32:
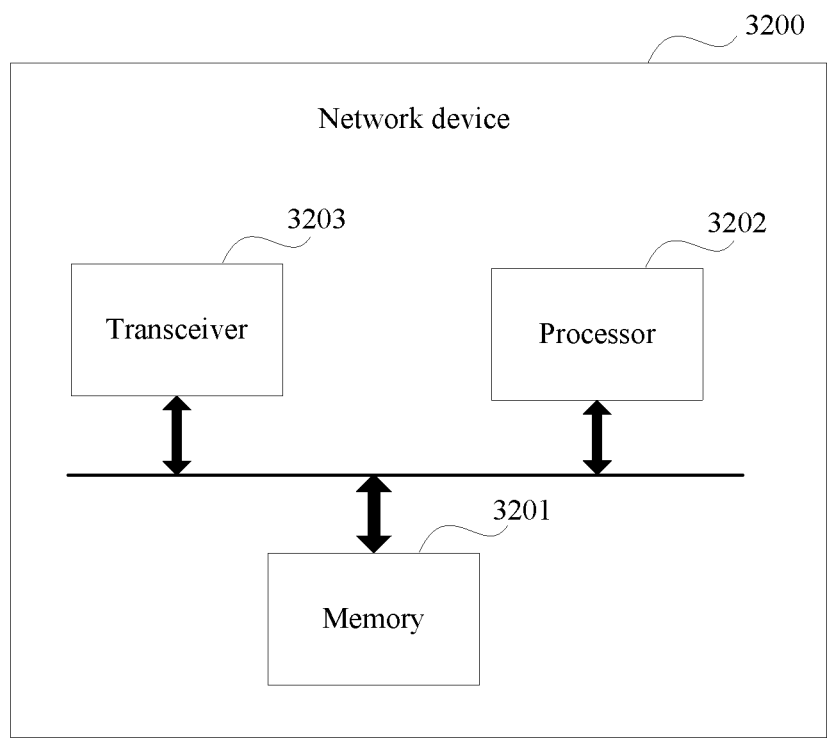
FIG. 32 is a schematic diagram of still another possible network device according to an embodiment of this application.

When the processing unit 3102 is a processor, the communications unit 3103 is a transceiver, and the storage unit 3101 is a memory, the network device in this application may be a network device 3200 shown in FIG. 32.

As shown in FIG. 32, the network device 3200 includes a processor 3202, a transceiver 3203, and a memory 3201. The transceiver 3203, the processor 3202, and the memory 3201 may communicate with each other through an internal connection channel, to transmit a control signal and/or a data signal.

It may be clearly understood by a person skilled in the art that, for ease and brief description, for a detailed working process of the foregoing apparatus and units, refer to a corresponding process in the foregoing method embodiments. Details are not described herein again.

According to the network device 3100 and the network device 3200 provided in this application, the control resource set configured by using the fourth configuration information is a subset of the transmission resource whose transmission direction is the downlink direction, and the network device does not need to indicate whether the control resource set is available, thereby reducing signaling overheads.

It should be understood that the transceiver may include a transmitter and a receiver. The transceiver may further include an antenna. There may be one or more antennas. The memory may be an independent device, or may be integrated into the processor. All or some of the foregoing components may be integrated into a chip for implementation, for example, integrated into a baseband chip for implementation.

The network device or the terminal device in each apparatus embodiment corresponds to the network device or the terminal device in the corresponding method embodiment. A corresponding module performs a corresponding step. For example, a sending module or a transmitter performs a sending step in the method embodiment, and a receiving module or a receiver performs a receiving step in the method embodiment. Steps except the sending and receiving steps may be performed by a processing module or a processor. For a function of a specific module, refer to a corresponding method embodiment. Details are not described again.

It should be understood that sequence numbers of the foregoing processes do not mean execution sequences in the embodiments of this application. The execution sequences of the processes should be determined based on functions and internal logic of the processes, and should not be construed as any limitation on the implementation processes of this application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Method or algorithm steps described in combination with the content disclosed in this application may be implemented by hardware, or may be implemented by a processor by executing a software instruction. The software instruction may be provided by a corresponding software module. The software module may be stored in a random access memory (RAM), a flash memory, a read-only memory (ROM), an erasable programmable read only memory (erasable programmable ROM, EPROM), an electrically erasable programmable read only memory (electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a terminal device. Certainly, the processor and the storage medium may exist as discrete components in a terminal device or a network device.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer instruction is loaded and executed on a computer, some or all of the processes or functions according to this application are generated. The computer may be a general purpose computer, a special-purpose computer, a computer network, or another programmable apparatus. The computer instruction may be stored in a computer readable storage medium, or may be transmitted by using the computer readable storage medium. The computer instruction may be transmitted from one website, computer, server, or data center to another website, computer, server, or data center in a wired (for example, a coaxial cable, an optical fiber, or a digital subscriber line (DSL)) manner or a wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid state disk (SSD)), or the like.

The objectives, technical solutions, and benefits of this application are further described in detail in the foregoing specific implementations. It should be understood that the foregoing descriptions are merely specific implementations of this application, but are not intended to limit the protection scope of this application. Any modification, equivalent replacement, improvement, and the like made based on the technical solutions of this application shall fall within the protection scope of this application.

What is claimed is:

1. An uplink information receiving method, comprising:
   determining, based on a transmission direction of a transmission resource and a preset grant-free transmission resource, a grant-free transmission resource used for uplink transmission, wherein the transmission resource comprises the grant-free transmission resource; and
   receiving uplink information on the grant-free transmission resource used for uplink transmission;
   wherein before the receiving the uplink information on the grant-free transmission resource used for uplink transmission, the method further comprises:
   sending first information, wherein the first information is used to indicate the transmission direction of the transmission resource,
   wherein the first information comprises:
      first indication information, wherein the first indication information is used to indicate the transmission direction of the transmission resource, and
      second indication information, wherein the second indication information is used to indicate the transmission direction of the transmission resource, and
   wherein the first indication information and the second indication information are carried in different signaling.

2. The method according to claim 1, wherein before the receiving uplink information on the grant-free transmission resource used for uplink transmission, the method further comprises:
   sending first configuration information, wherein the first configuration information is used to configure the preset grant-free transmission resource.

3. The method according to claim 1, wherein the second indication information is carried in physical layer signaling, and the method further comprises:
   sending second configuration information, wherein the second configuration information is used to configure a first control resource set, and the first control resource set is used to transmit the second indication information.

4. The method according to claim 1, wherein the first information further comprises third indication information, the third indication information is used to indicate a transmission direction of a flexible and variable resource in the transmission resource, and the method further comprises:
   sending third configuration information, wherein the third configuration information is used to configure a second control resource set, and the second control resource set is used to transmit the third indication information.

5. The method according to claim 1, wherein before the receiving uplink information on the grant-free transmission resource used for uplink transmission, the method further comprises:
   sending fourth indication information, wherein the fourth indication information is used to indicate an offset of the preset grant-free transmission resource.

6. An uplink information sending apparatus, comprising a processor and a transceiver, wherein:
   the processor is configured to determine, based on a transmission direction of a transmission resource and a preset grant-free transmission resource, a grant-free transmission resource used for uplink transmission, wherein the transmission resource comprises the grant-free transmission resource; and
   the transceiver is configured to send uplink information on the grant-free transmission resource that is used for uplink transmission and that is determined by the processor;
   wherein, before sending the uplink information on the grant-free transmission resource, the transceiver is further configured to:
   receive first information, wherein the first information is used to indicate the transmission direction of the transmission resource,
   wherein the first information comprises:
      first indication information, wherein the first indication information is used to indicate the transmission direction of the transmission resource, and
      second indication information, wherein the second indication information is used to indicate the transmission direction of the transmission resource, and
   wherein the first indication information and the second indication information are carried in different signaling.

7. The apparatus according to claim 6, wherein the transceiver is further configured to:
   receive first configuration information, wherein the first configuration information is used to configure the preset grant-free transmission resource.

8. The apparatus according to claim 6, wherein the second indication information is carried in physical layer signaling, and the transceiver is further configured to:
   receive second configuration information, wherein the second configuration information is used to configure a first control resource set; and
   monitor the second indication information on the first control resource set.

9. The apparatus according to claim 6, wherein the first information further comprises third indication information, the third indication information is used to indicate a transmission direction of a flexible and variable resource in the transmission resource, and the transceiver is further configured to:
   receive third configuration information, wherein the third configuration information is used to configure a second control resource set; and
   monitor the third indication information on the second control resource set.

10. The apparatus according to claim 6, wherein:
    the transceiver is further configured to receive fourth indication information, wherein the fourth indication information is used to indicate an offset of the preset grant-free transmission resource; and
    the processor is specifically configured to determine the grant-free transmission resource used for uplink transmission based on the transmission direction of the transmission resource, the preset grant-free transmission resource, and the fourth indication information.

11. The apparatus according to claim 6, wherein
    the grant-free transmission resource used for uplink transmission is a transmission resource whose transmission direction is an uplink transmission direction in a time period corresponding to the preset grant-free transmission resource.

12. An uplink information receiving apparatus, comprising a processor and a transceiver, wherein:
    the processor is configured to determine, based on a transmission direction of a transmission resource and a preset grant-free transmission resource, a grant-free transmission resource used for uplink transmission, wherein the transmission resource comprises the grant-free transmission resource; and
    the transceiver is configured to receive uplink information on the grant-free transmission resource that is used for uplink transmission and that is determined by the processor;

wherein, before receiving the uplink information on the grant-free transmission resource, the transceiver is further configured to:

send first information, wherein the first information is used to indicate the transmission direction of the transmission resource, wherein the first information comprises:

first indication information, wherein the first indication information is used to indicate the transmission direction of the transmission resource, and second indication information, wherein the second indication information is used to indicate the transmission direction of the transmission resource, and wherein the first indication information and the second indication information are carried in different signaling.

13. The apparatus according to claim 12, wherein the transceiver is further configured to:

send first configuration information, wherein the first configuration information is used to configure the preset grant-free transmission resource.

14. The apparatus according to claim 12, wherein the second indication information is carried in physical layer signaling, and the transceiver is further configured to:

send second configuration information, wherein the second configuration information is used to configure a first control resource set, and the first control resource set is used to transmit the second indication information.

15. The apparatus according to claim 12, wherein the first information further comprises third indication information, the third indication information is used to indicate a transmission direction of a flexible and variable resource in the transmission resource, and the transceiver is further configured to:

send third configuration information, wherein the third configuration information is used to configure a second control resource set, and the second control resource set is used to transmit the third indication information.

16. The apparatus according to claim 12, wherein the transceiver is further configured to:

send fourth indication information, wherein the fourth indication information is used to indicate an offset of the preset grant-free transmission resource.

17. A non-transitory computer readable storage medium, wherein the non-transitory computer readable storage medium stores a computer program, and executing the computer program by a computer configures the computer to perform a method comprising:

determining, based on a transmission direction of a transmission resource and a preset grant-free transmission resource, a grant-free transmission resource used for uplink transmission, wherein the transmission resource comprises the grant-free transmission resource; and sending uplink information on the grant-free transmission resource used for uplink transmission;

wherein before the sending the uplink information on the grant-free transmission resource used for uplink transmission, the method further comprises:

receiving first information, wherein the first information is used to indicate the transmission direction of the transmission resource, wherein the first information comprises:

first indication information, wherein the first indication information is used to indicate the transmission direction of the transmission resource, and second indication information, wherein the second indication information is used to indicate the transmission direction of the transmission resource, and wherein the first indication information and the second indication information are carried in different signaling.

* * * * *

UNITED STATES PATENT AND TRADEMARK OFFICE
CERTIFICATE OF CORRECTION

PATENT NO. : 11,470,627 B2
APPLICATION NO. : 16/793866
DATED : October 11, 2022
INVENTOR(S) : Xia et al.

It is certified that error appears in the above-identified patent and that said Letters Patent is hereby corrected as shown below:

On the Title Page

Page 2: Item (56) Other Publications, Column 1, Line 14: "TSG RAN WG1 NR ad-Hoc#2, Qingdap, China, R1-1710699," should read -- TSG RAN WG1 NR ad-Hoc#2, Qingdao, China, R1-1710699, --.

Signed and Sealed this
Twenty-eighth Day of February, 2023

Katherine Kelly Vidal
*Director of the United States Patent and Trademark Office*